(12) United States Patent
Lee et al.

(10) Patent No.: US 11,181,508 B2
(45) Date of Patent: Nov. 23, 2021

(54) GAS SENSING DEVICE, ELECTRONIC DEVICE INCLUDING THE GAS SENSING DEVICE, AND GAS SENSING SYSTEM

(71) Applicant: Samsung Electronics Co., Ltd., Suwon-si (KR)

(72) Inventors: Si-hoon Lee, Yongin-si (KR); Min-chul Lee, Seongnam-si (KR); Kwang-min Park, Daejeon (KR); Jeong-ho Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 185 days.

(21) Appl. No.: 16/416,704

(22) Filed: May 20, 2019

(65) Prior Publication Data

US 2020/0132630 A1 Apr. 30, 2020

(30) Foreign Application Priority Data

Oct. 29, 2018 (KR) .......................... 10-2018-0130241

(51) Int. Cl.
*G01N 29/32* (2006.01)
*G01N 29/02* (2006.01)

(52) U.S. Cl.
CPC ......... *G01N 29/326* (2013.01); *G01N 29/022* (2013.01); *G01N 2291/014* (2013.01); *G01N 2291/021* (2013.01)

(58) Field of Classification Search
CPC ............... G01N 29/022; G01N 29/326; G01N 2291/014; G01N 2291/021; G01N 2291/0426; G01N 29/32; G01N 29/30; G01N 29/036; G01N 33/0031
See application file for complete search history.

(56) References Cited

U.S. PATENT DOCUMENTS

| 5,605,612 | A | 2/1997 | Park et al. |
| 6,321,588 | B1 * | 11/2001 | Bowers ................ G01N 29/226 73/24.01 |
| 7,253,495 | B2 | 8/2007 | Sutardja |
| 7,385,334 | B1 | 6/2008 | Olsson et al. |
| 7,915,974 | B2 | 3/2011 | Piazza et al. |
| 7,989,851 | B2 | 8/2011 | Lu et al. |
| 8,273,594 | B2 | 9/2012 | Quevy et al. |
| 9,255,912 | B2 | 2/2016 | Johnston et al. |

(Continued)

FOREIGN PATENT DOCUMENTS

| JP | 6229967 B2 | 11/2017 |
| KR | 1019950014873 | 6/1995 |

*Primary Examiner* — Benjamin R Schmitt
(74) *Attorney, Agent, or Firm* — Harness, Dickey & Pierce, P.L.C.

(57) ABSTRACT

A gas sensing system includes a driving circuit chip, and a gas sensor, a temperature sensor, and a humidity sensor, which are located on the driving circuit chip. The gas sensing system compensates a gas sensing result based on at least one of a temperature sensing result and a humidity sensing result and generates a gas sensing signal. The gas sensor includes a first resonator and a first sensing film being configured to sense a first gas and located on the first resonator to be exposed to the outside. The temperature sensor includes a second resonator and an encapsulation layer located above the second resonator not to expose the second resonator to the outside, and the humidity sensor includes a third resonator.

20 Claims, 15 Drawing Sheets

(56) References Cited

U.S. PATENT DOCUMENTS

| | | | |
|---|---|---|---|
| 9,465,012 B2 | 10/2016 | Flewitt et al. | |
| 2010/0007444 A1 | 1/2010 | Nordin et al. | |
| 2011/0113856 A1* | 5/2011 | Cobianu | G01N 29/30 73/24.06 |
| 2012/0293520 A1 | 11/2012 | Yun et al. | |
| 2014/0117815 A1 | 5/2014 | Bl et al. | |
| 2014/0331778 A1* | 11/2014 | Flewitt | G01N 29/326 73/766 |
| 2014/0377877 A1* | 12/2014 | Burgi | G01N 33/4972 436/120 |
| 2017/0122892 A1* | 5/2017 | Li | G01N 27/127 |

* cited by examiner

GAS SENSING DEVICE, ELECTRONIC DEVICE INCLUDING THE GAS SENSING DEVICE, AND GAS SENSING SYSTEM

CROSS-REFERENCE TO RELATED APPLICATION

This application claims the benefit of Korean Patent Application No. 10-2018-0130241, filed on Oct. 29, 2018, in the Korean Intellectual Property Office, the disclosure of which is incorporated herein in its entirety by reference.

BACKGROUND

Example embodiments of the inventive concepts relate to a gas sensing device, an electronic device and/or a gas sensing system. For example, at least some example embodiments relate to a resonance-type gas sensing device, an electronic device including the resonance-type gas sensing device, and/or a gas sensing system.

A gas sensing device may include a gas sensor having a resonator, and the resonator may be implemented as, for example, a film bulk acoustic resonator (FBAR). The FBAR may be a resonator in which a lower electrode, a piezoelectric layer, and an upper electrode are sequentially stacked. The FBAR may be based on a principle that when electric energy is applied to the lower electrode and the upper electrode, an acoustic wave is generated due to a piezoelectric effect and thus, resonance occurs in a direction in which the lower electrode, the piezoelectric layer, and the upper electrode are stacked. The gas sensor may further include a sensing film, such as a polymer with which the FBAR is coated. A resonance frequency of the FBAR may be changed according to gas molecules adsorbed on the sensing film. However, the resonance frequency of the FBAR may be affected by environmental factors, such as temperature and moisture. For example, the resonance frequency of the FBAR may be reduced with a rise in temperature and may increase with an increase in humidity.

SUMMARY

Example embodiments of the inventive concepts provide a gas sensing device by which the influence of an environmental factor is compensated in a gas sensing result of a gas sensor to improve a gas sensing precision, an electronic device including the gas sensing device, and/or a gas sensing system.

According to an example embodiment of the inventive concepts, a gas sensing system includes a driving circuit chip; a gas sensor on the driving circuit chip, the gas sensor including a first resonator and a first sensing film, the first sensing film being located on the first resonator such that the first sensing film is exposed to an outside of the gas sensing system, the first sensing film configured to sense a first gas to generate a gas sensing result; a temperature sensor on the driving circuit chip, the temperature sensor including a second resonator and an encapsulation layer, the encapsulation layer being located above the second resonator such that the second resonator is not exposed to the outside of the gas sensing system, the temperature sensor configured to sense temperature to generate a temperature sensing result; and a humidity sensor on the driving circuit chip, the humidity sensor including a third resonator, the humidity sensor configured to sense humidity to generate a humidity sensing result, wherein the gas sensing system is configured to adjust the gas sensing result based on at least one of the temperature sensing result and the humidity sensing result to generate a gas sensing signal.

According to another example embodiment of the inventive concepts, a gas sensing device includes a driving circuit chip configured to adjust a first sensing result based on a second sensing result to generate at least a first gas sensing signal; a first sensor on the driving circuit chip, the first sensor including a first resonator and a first sensing film, the first sensing film being on the first resonator such that the first sensing film is exposed to an outside of the gas sensing device, the first sensing film being configured to sense a first gas to generate the first sensing result; and a second sensor on the driving circuit chip, the second sensor including a second resonator and an encapsulation layer, the encapsulation layer being on top of the second resonator such that the second resonator is not exposed to the outside of the gas sensing device, the second sensor configured to generate the second sensing result.

According to another example embodiment of the inventive concepts, an electronic device may be configured to generate a gas sensing signal. The electronic device may include an application processor; and a gas sensing device electrically connected to the application processor, the gas sensing device including, a driving circuit chip, a gas sensor on the driving circuit chip, the gas sensor including a first resonator and a first sensing film on the first resonator such that the first sensing film is exposed to an outside of the gas sensing device, the first sensing film being configured to sense a first gas to generate a gas sensing result, a temperature sensor on the driving circuit chip, the temperature sensor including a second resonator and an encapsulation layer on the second resonator such that the second resonator is not exposed to the outside of the gas sensing device, the temperature sensor configured to sense temperature to generate a temperature sensing result, and a humidity sensor on the driving circuit chip, the humidity sensor including a third resonator, the humidity sensor configured to sense humidity to generate a humidity sensing result.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
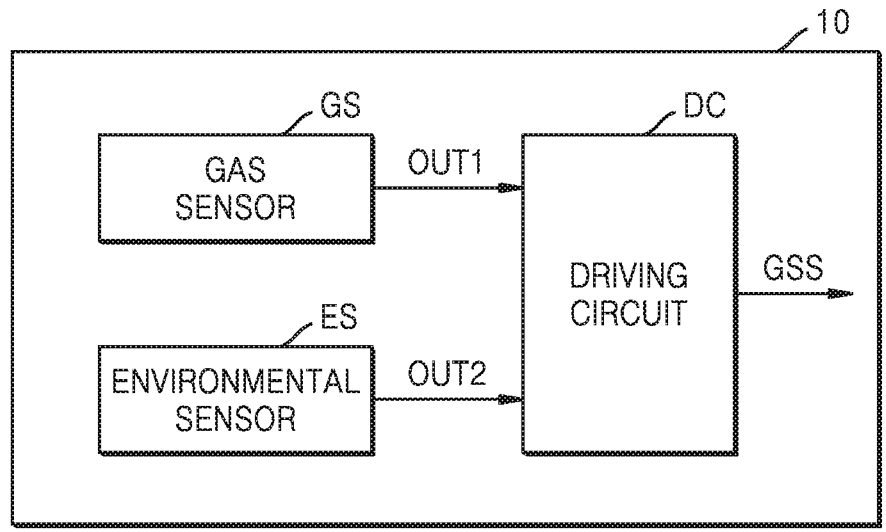
FIG. 1 is a block diagram of a gas sensing device according to an example embodiment.

FIG. 1 is a block diagram of a gas sensing device 10 according to an example embodiment.

Referring to FIG. 1, the gas sensing device 10 may include a gas sensor GS, an environmental sensor ES, and a driving circuit DC.

The gas sensing device 10 may sense and measure a smell or a gas and thus, may be referred to as an "electronic nose system." In an example embodiment, each of the gas sensor GS, the environmental sensor ES, and the driving circuit DC may be implemented as a semiconductor chip and thus, the gas sensing device 10 may be implemented as a semiconductor package.

The gas sensor GS may sense gases in the air and output a first sensing result OUT1. The environmental sensor ES may sense, for example, an environmental factor, such as temperature, humidity, atmospheric pressure, and/or light, and output a second sensing result OUT2. The driving circuit DC may receive the first and second sensing results OUT1 and OUT2, compensate the first sensing result OUT1 based on the second sensing result OUT2, and generate a gas sensing signal GSS.

Specifically, assuming that a frequency variation of the first sensing result OUT1 is $\Delta f_{OUT1}$ and a frequency variation of the second sensing result OUT2 is $\Delta f_{OUT2}$, a frequency variation $\Delta f_{GSS}$ of the gas sensing signal GSS may correspond to a difference between the frequency variation $\Delta f_{OUT1}$ of the first sensing result OUT1 and the frequency variation $\Delta f_{OUT2}$ of the second sensing result OUT2 (i.e., $\Delta f_{GSS}=\Delta f_{OUT1}-\Delta f_{OUT2}$). Thus, the influence of ambient environments may be removed from the first sensing result OUT1, which is an output of the gas sensor GS, so that a sensing precision of the gas sensing device 10 may be improved.

In an example embodiment, the gas sensing signal GSS may be as shown in Equation 1:

$$f(\text{gas})=f(\text{measurement})-f(\text{environment}) \quad \text{Equation 1}$$

wherein f(measurement) may include the first sensing result OUT1, which is an output of an actual sensor (i.e., the output of the gas sensor GS), and the second sensing result OUT2, which is the output of the environmental sensor ES. Here, f(environment) may be inferred from a model equation measured in a laboratory. Thus, f(environment) may be referred to as f(environment_calculation). In an example embodiment, f(environment_calculation) may be as shown in Equation 2:

$$f(\text{environment\_calculation})=A*f_T+B*f_H+C*f_P+D*f_U+E \quad \text{Equation 2}$$

wherein A, B, C, D, and E denote coefficients generated through experiments, $f_T$ denotes an output value of a temperature sensor, $f_H$ denotes an output value of a humidity sensor, $f_P$ denotes an output value of a pressure sensor, and $f_U$ denotes an output value of an illuminance sensor. As described above, since f(environment_calculation) may be inferred from the values obtained by a plurality of environmental sensors, it may be assumed that f(environment_measurement) corresponds to f(environment_calculation).

In an example embodiment, each of the gas sensor GS and the environmental sensor ES may be implemented as a resonance-type device including a resonator. For instance, each of the gas sensor GS and the environmental sensor ES may include a film bulk acoustic resonator (FBAR). Thus, the gas sensor GS and the environmental sensor ES may be referred to as FBAR sensors. The gas sensing device 10 (or a gas sensing system) including an FBAR sensor may be used as an electronic nose system and sense various kinds of gases that are harmful to humans, for example, carbon monoxide (CO), benzene, and a total volatile organic compound (TVOC). According to example embodiments, the gas sensing device 10 may be implemented using a plurality of FBARs coated with polymers, each of which reacts with a specific gas, and may be efficiently mounted on small mobile products.

In an example embodiment, the gas sensor GS may include an FBAR and a polymer. When gas is adsorbed on the polymer, a resonance frequency of the FBAR may be changed. However, the resonance frequency of the FBAR included in the gas sensor GS may also be changed by other environmental factors (e.g., temperature, humidity, particles, atmospheric pressure, light, and flow of gas) in addition to the adsorption of gases. Therefore, the first sensing result OUT1 of the gas sensor GS may include the influence of other environmental factors together with a gas sensing result. However, in example embodiments, the first sensing result OUT1 may be compensated to remove the influence of other environmental factors from the first sensing result OUT1.

In an example embodiment, the gas sensor GS and the environmental sensor ES may be implemented as individual sensor dies or individual sensor chips. In other words, the gas sensor GS and the environmental sensor ES may be formed on respectively different wafers. In an example embodiment, the gas sensor GS may be implemented to expose a sensing film configured to sense a gas, and the environmental sensor ES may have an encapsulation structure and thus may not be exposed to the outside. Thus, the second sensing result OUT2 of the environmental sensor ES may not include the influence of a gas. The driving circuit DC may subtract the second sensing result OUT2 from the first sensing result OUT1 and generate the gas sensing signal GSS based on the gas sensing result, thereby improving a sensing precision of the gas sensing device 10.

In some example embodiments, the driving circuit DC may correspond to an application processor (AP), and the gas sensor GS and the environmental sensor ES may be connected to the AP. Thus, the AP may process the first and second sensing results OUT1 and OUT2. In this case, the gas sensing device 10 may be referred to as a gas sensing system.

Furthermore, in some example embodiments, the gas sensing device 10 may include only the gas sensor GS and the environmental sensor ES, and the first and second sensing results OUT1 and OUT2 may be processed by an algorithm on a cloud server. In this case, the gas sensor GS, the environmental sensor ES, and the cloud server may constitute a gas sensing system.

Figure 2:
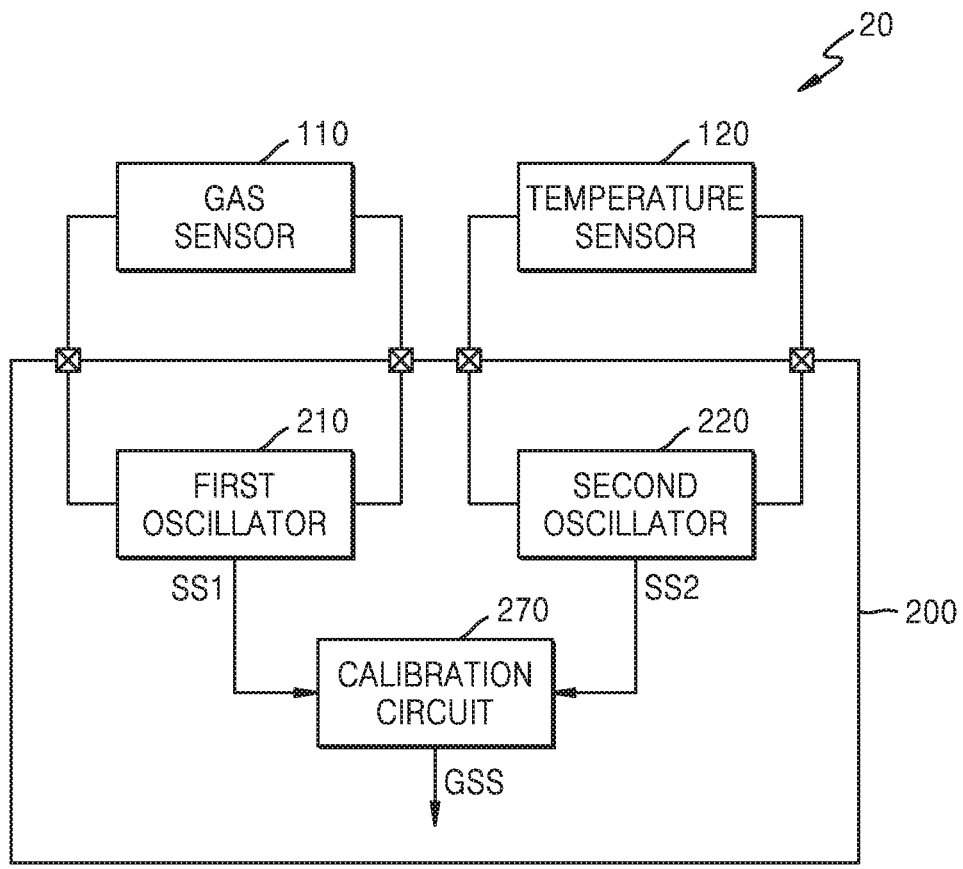
FIG. 2 is a block diagram of a gas sensing device according to an example embodiment.

FIG. 2 is a block diagram of a gas sensing device 20 according to an example embodiment.

Referring to FIG. 2, the gas sensing device 20 may include a gas sensor 110, a temperature sensor 120, and a driving circuit chip 200, and the driving circuit chip 200 may include a first oscillator 210, a second oscillator 220, and a calibration circuit 270. The gas sensing device 20 may be an embodied example of the gas sensing device 10 of FIG. 1. The gas sensor 110 may be an example of the gas sensor GS of FIG. 1, the temperature sensor 120 may be an example of the environmental sensor ES of FIG. 1, and the driving circuit chip 200 may be an example of the driving circuit DC of FIG. 1.

The gas sensor 110, the temperature sensor 120, and the driving circuit chip 200 may be implemented in various manners and also, variously defined. For example, the gas sensor 110 and the temperature sensor 120 may be implemented on a different wafer from the driving circuit chip 200 using a different process from the driving circuit chip 200. Also, the gas sensor 110 and the temperature sensor 120 may be implemented as chips having various kinds of levels (e.g., a die level and a package level). For example, each of the gas sensor 110 and the temperature sensor 120 may be a chip including at least one resonator that is implemented using a micro-electro-mechanical-system (MEMS) process. For example, the driving circuit chip 200 may include various circuits implemented using a complementary metal-oxide-semiconductor (CMOS) process. Thus, the driving circuit chip 200 may be referred to as a "CMOS chip" or a "semiconductor chip." When the driving circuit chip 200 functions as an oscillator configured to output an oscillation signal, the driving circuit chip 200 may be referred to as an "oscillator chip."

According to an example embodiment, each of the gas sensor 110 and the temperature sensor 120 may be implemented as an FBAR and have a resonance frequency according to a structure of the FBAR. The gas sensor 110 may be implemented as a gas sensor 110 shown in FIG. 3A. Meanwhile, the temperature sensor 120 may be implemented as a temperature sensor 120 shown in FIG. 3B.

The first oscillator 210 may output an oscillation signal (i.e., a first sensing signal SS1) having a frequency corresponding to the resonance frequency of the gas sensor 110. The second oscillator 220 may output an oscillation signal (i.e., a second sensing signal SS2) having a frequency corresponding to the resonance frequency of the temperature sensor 120. The calibration circuit 270 may calibrate the first sensing signal SS1 based on the second sensing signal SS2 and generate a gas sensing signal GSS. In this case, a frequency relative to a temperature may be as shown in Equation 3:

$$f(\text{temp}) = A * f_{SS2} + E \qquad \text{Equation 3}$$

wherein A denotes a temperature coefficient, E denotes a constant, and $f_{SS2}$ denotes the frequency of the second sensing signal SS2.

Accordingly, from Equation 3, a frequency $f_{GSS}$ of the gas sensing signal GSS may be as shown in Equation 4:

$$f_{GSS} = f_{SS1} - f(\text{temp}) = f_{SS1} - (A * f_{SS2} + E) \qquad \text{Equation 4}$$

As described above, the frequency $f_{GSS}$ of the gas sensing signal GSS may correspond to a frequency caused by the adsorption of a gas. Accordingly, a sensing result may be obtained by removing the influence of temperature from a sensing result of the gas sensor 110.

Figure 3A:
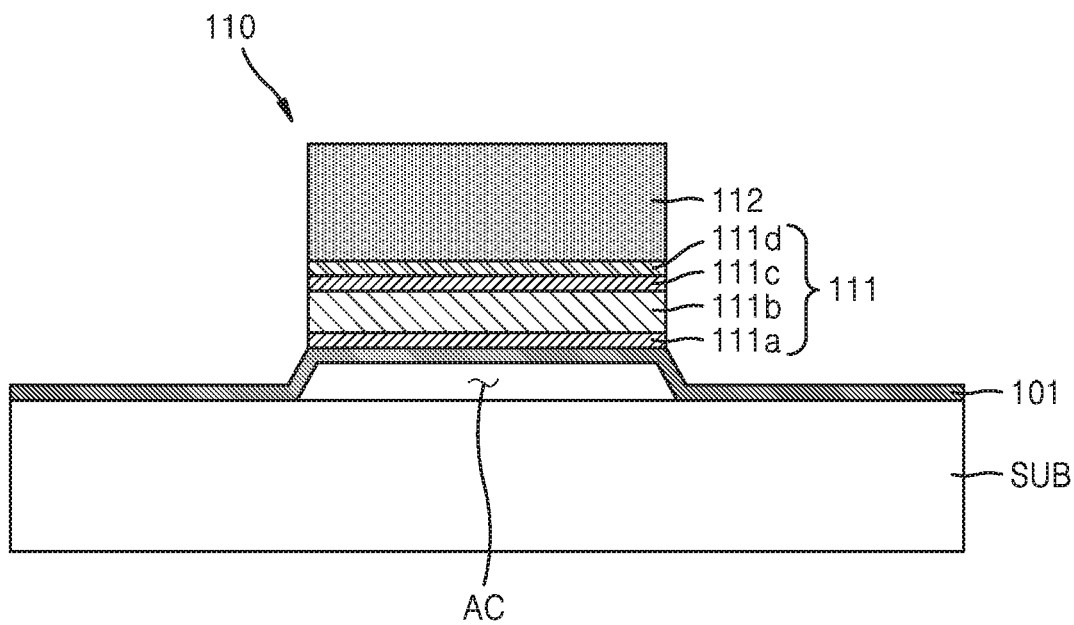
FIG. 3A is a cross-sectional view of an example of a gas sensor of FIG. 2.

FIG. 3A is a cross-sectional view of an example of the gas sensor 110 of FIG. 2.

Referring to FIG. 3A, the gas sensor 110 may include a substrate SUB, an FBAR 111, and a sensing film 112. The substrate SUB may include a semiconductor substrate including a material, such as silicon, germanium, silicon germanium, gallium arsenide, and indium phosphide. The FBAR 111 may include a lower electrode 111a, a piezoelectric layer 111b, an upper electrode 111c, and an upper passivation layer 111d. A lower passivation layer 101 may be located on the substrate SUB. The lower passivation layer 101 may include, for example, silicon nitride (SiN), aluminium nitride (AlN), silicon carbide (SiC), and silicon oxycarbide (SiOC).

A cavity AC (e.g., an air cavity AC) may be located between a partial region of the substrate SUB and the lower passivation layer 101. For example, the substrate SUB may not be in contact with the lower passivation layer 101 in a region vertically overlapping the cavity AC and may be in contact with the lower passivation layer 101 in a region that does not vertically overlap the cavity AC. Although not shown, when viewed from above, the cavity AC may have various shapes, such as a circular shape, a triangular shape, and a polygonal shape. A stack structure in which the lower electrode 111a, the piezoelectric layer 111b, the upper electrode 111c, and the upper passivation layer 111d are sequentially stacked may be located on the lower passivation layer 101. The sensing film 112 may be located on the upper passivation layer 111d.

The piezoelectric layer 111b may be implemented as a thin film type and include zinc oxide (ZnO), aluminium nitride (AlN), quartz crystal, lead zirconate titanate (PZT), or various other kinds of piezoelectric materials. A resonance frequency of the FBAR 111 may be determined by a thickness and other design characteristics of the piezoelectric layer 111b. When a radio-frequency (RF) voltage corresponding to the resonance frequency is applied to the lower electrode 111a and the upper electrode 111c, the FBAR 111 may resonate in a direction in which the lower electrode 111a, the piezoelectric layer 111b, and the upper electrode 111c are stacked. The FBAR 111 may be coated with the sensing film 112 to sense or measure a target gas.

Figure 4:
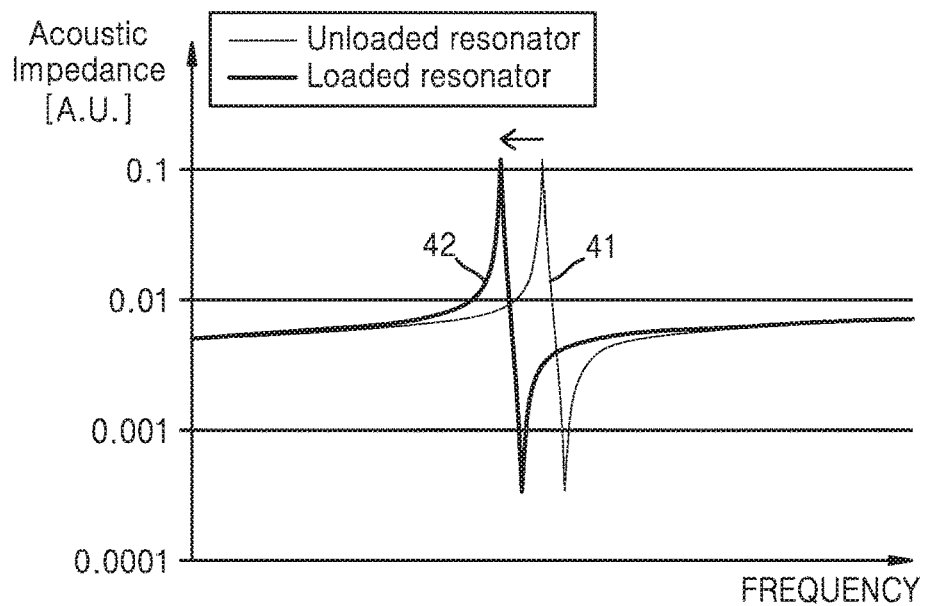
FIG. 4 is a graph showing a variation in resonance frequency of the gas sensor of FIG. 3A.

FIG. 4 is a graph showing a variation in resonance frequency of the gas sensor 110 of FIG. 3A.

Referring to FIG. 4, the abscissa denotes frequency, and the ordinate denotes acoustic impedance. In this case, a first curve 41 shows a resonance frequency of the gas sensor 110 when target gas molecules are not sensed by the sensing film 112 (i.e., the resonance frequency of the unloaded resonator). A second curve 42 shows a resonance frequency of the gas sensor 110 when target gas molecules are sensed by the sensing film 112 (i.e., the resonance frequency of the loaded resonator). As described above, when the target gas molecules are sensed by the sensing film 112, the resonance frequency of the gas sensor 110 may be changed, so that the frequency of the oscillation signal (i.e., the first sensing signal SS1) output by the first oscillator 210 may be changed. Accordingly, the target gas may be sensed or measured by detecting the frequency of the first sensing signal SS1.

Referring back to FIG. 3A, a material included in the sensing film 112 may be variously changed according to a kind of a sensed gas (i.e., a kind of the target gas). Also, a receptor of the sensing film 112 may include various kinds of materials, and the resonance frequency of the FBAR 111 may be changed according to the kind or concentration of a gas sensed by the sensing film 112. For example, the sensing film 112 may be implemented as a polymer.

Figure 3B:
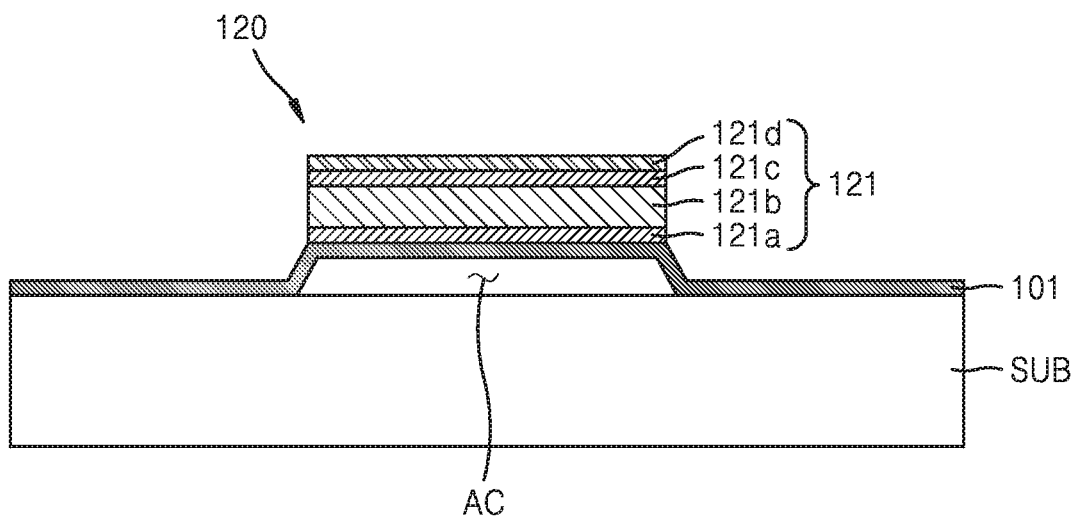
FIG. 3B is a cross-sectional view of an example of a temperature sensor of FIG. 2.

FIG. 3B is a cross-sectional view of an example of the temperature sensor 120 of FIG. 2.

Referring to FIG. 3B, the temperature sensor 120 may include a substrate SUB and an FBAR 121. The FBAR 121 may have a structure in which a lower electrode 121a, a piezoelectric layer 121b, an upper electrode 121c, and an upper passivation layer 121d are sequentially stacked. Thus, the temperature sensor 120 may be referred to as an FBAR temperature sensor.

Figure 5:
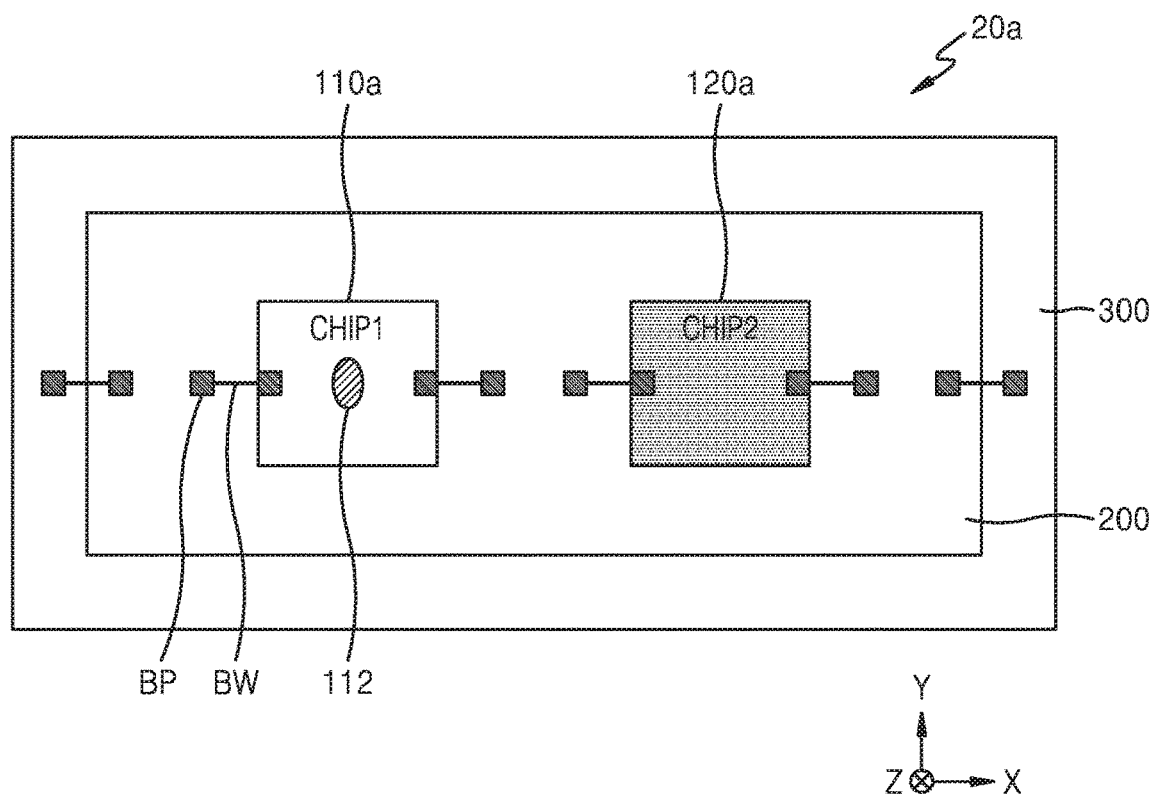
FIG. 5 is a plan view of a gas sensing device according to an example embodiment.
Figure 6:
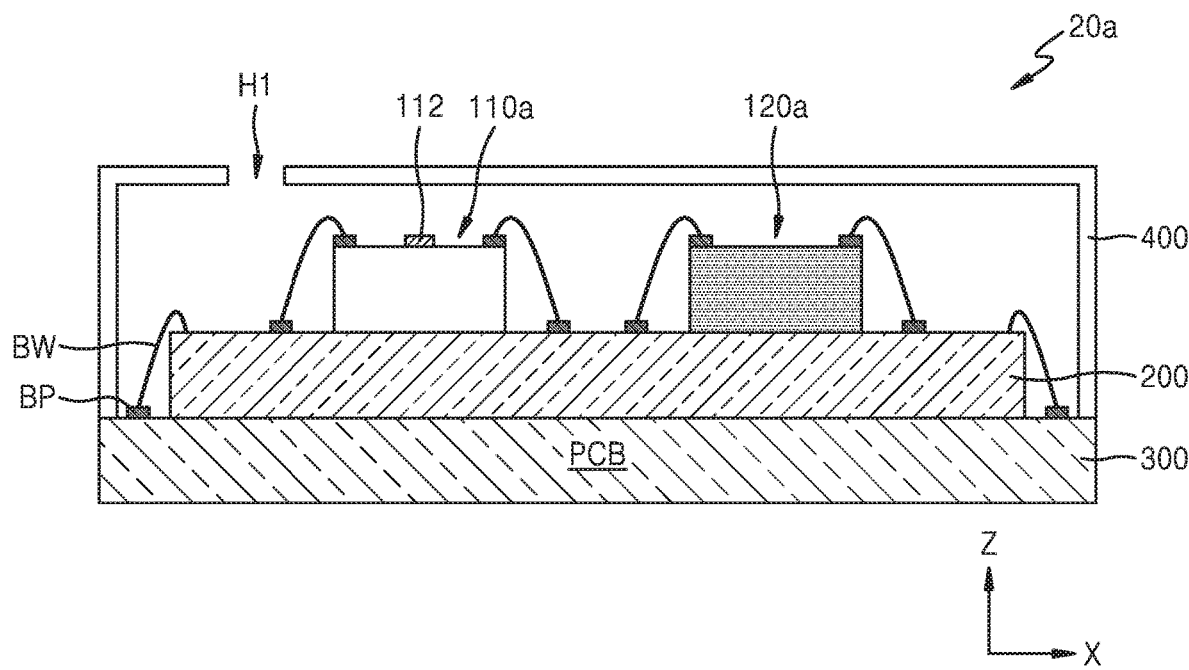
FIG. 6 is a cross-sectional view of a gas sensing device according to an example embodiment.
Figure 7:
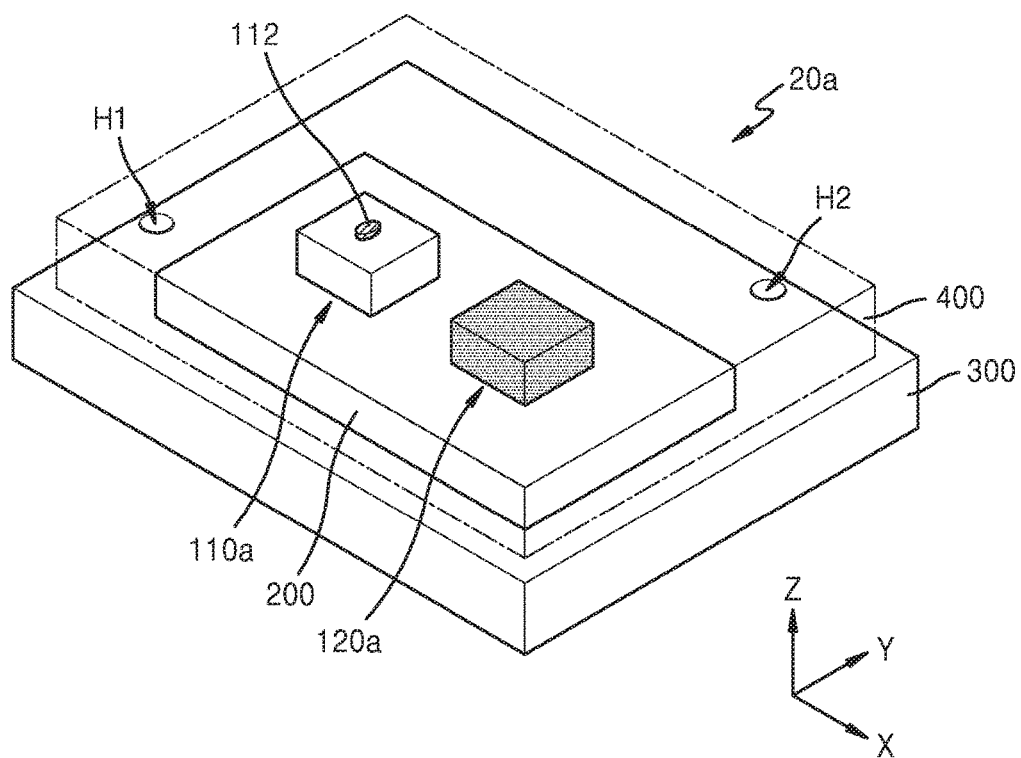
FIG. 7 is a perspective view of a gas sensing device according to an example embodiment.

FIG. 5 is a plan view of a gas sensing device 20a according to an example embodiment. FIG. 6 is a cross-sectional view of the gas sensing device 20a of FIG. 5, according to an example embodiment. FIG. 7 is a perspective view of the gas sensing device 20a of FIG. 5, according to an example embodiment. For example, the gas sensing device 20a may correspond to an embodied example of the gas sensing device 20 of FIG. 2.

Referring to FIGS. 5 to 7, the gas sensing device 20a may include a substrate 300, a driving circuit chip 200 located on the substrate 300, and a first sensor chip CHIP1 or 110a and a second sensor chip CHIP2 or 120a, which may be located on the driving circuit chip 200. As described above, the gas sensing device 20a may be implemented as a package including a plurality of chips. Thus, the gas sensing device 20a may be referred to as a gas sensing package or a gas sensing system.

The substrate 300 may include a package substrate or a printed circuit board (PCB). The driving circuit chip 200 may be mounted on the substrate 300 and electrically connected to the substrate 300 through a bonding wire BW. Specifically, the bonding wire BW may be connected to a bonding pad BP located on the driving circuit chip 200 and a bonding pad BP located on the substrate 300. Although not shown, a semiconductor chip other than the driving circuit chip 200 may be further located on the substrate 300.

For example, the first sensor chip 110a may correspond to an embodied example of the gas sensor 110 of FIG. 2. Hereinafter, the first sensor chip 110a will be referred to as a "gas sensor chip." The gas sensor chip 110a may be located on the driving circuit chip 200 and electrically connected to the driving circuit chip 200 through the bonding wire BW. Specifically, the bonding wire BW may be connected to a bonding pad BP located on the gas sensor chip 110a and the bonding pad BP located on the driving circuit chip 200. The gas sensor chip 110a may include a sensing film 112 that is exposed to the outside.

For example, the second sensor chip 120a may correspond to an embodied example of the temperature sensor 120 of FIG. 2. Hereinafter, the second sensor chip 120a will be referred to as a "temperature sensor chip." The temperature sensor chip 120a may be located on the driving circuit chip 200 and electrically connected to the driving circuit chip 200 through the bonding wire BW. Specifically, the bonding wire BW may be connected to a bonding pad BP located on the temperature sensor chip 120a and the bonding pad BP located on the driving circuit chip 200.

The gas sensing device 20a may further include a case member 400, which may be located over the substrate 300, the driving circuit chip 200, the gas sensor chip 110a, and the temperature sensor chip 120a. A first hole H1 and a second hole H2 may be formed in the case member 400. Gases may be supplied into or discharged from the gas sensing device 20a through the first and second holes H1 and H2 so that the sensing film 112 located on the gas sensor chip 110a may sense a target gas. The case member 400 may be referred to as a cover member or a housing. For instance, the case member 400 may be implemented as stainless steel or a plastic. In some example embodiments, a top surface of the case member 400 may be implemented as a mesh shape. Thus, the gases may be introduced or discharged more actively.

Figure 8A:
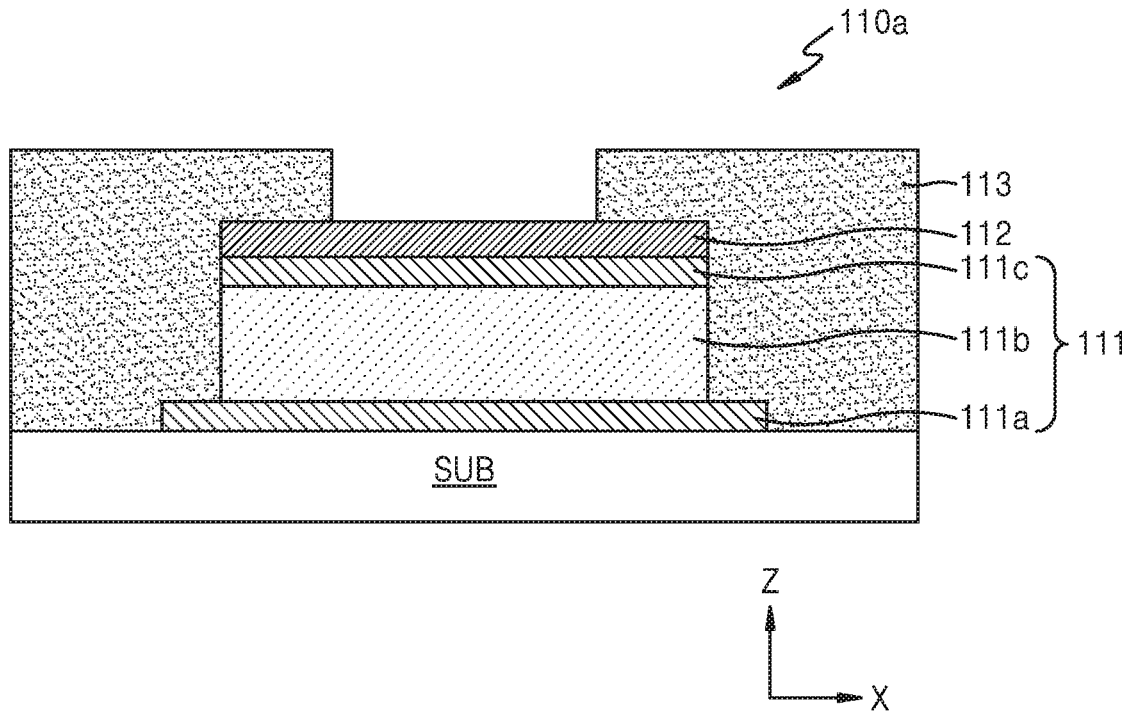
FIG. 8A is a cross-sectional view of a gas sensor chip of FIG. 6.

FIG. 8A is a cross-sectional view of the gas sensor chip 110a of FIG. 6.

Referring to FIG. 8A, the gas sensor chip 110a may include an FBAR 111 located on a substrate SUB and a sensing film 112 coated on the FBAR 111. In some example embodiments, the gas sensor chip 110a may further include a molding layer 113, but example embodiments of the inventive concepts are not limited thereto. Since the FBAR 111 and the sensing film 112 are similar to those of FIG. 3A, a description thereof will be omitted. The molding layer 113 may be formed on the substrate SUB, the FBAR 111, and the sensing film 112 and expose at least a portion of the sensing film 112.

Figure 8B:
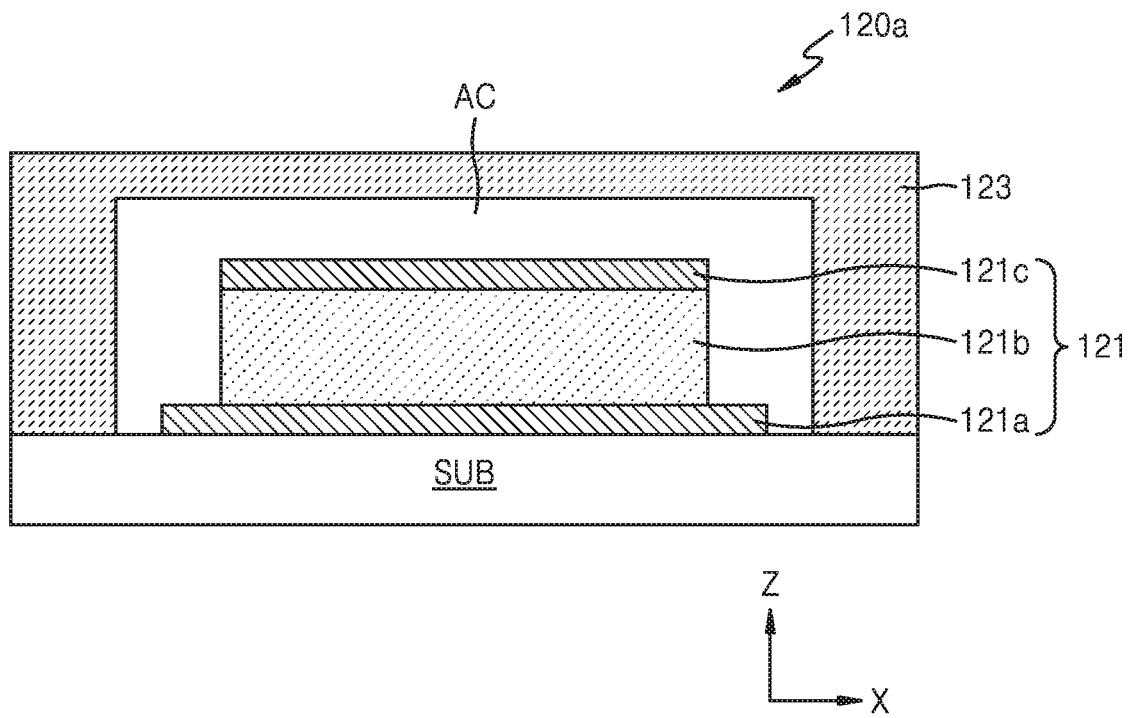
FIG. 8B is a cross-sectional view of a temperature sensor chip of FIG. 6.

FIG. 8B is a cross-sectional view of the temperature sensor chip 120a of FIG. 6.

Referring to FIG. 8B, the temperature sensor chip 120a may include an FBAR 121 located on a substrate SUB, an encapsulation layer 123, and an air cavity AC located between the FBAR 121 and the encapsulation layer 123. In this case, at least one of a lower electrode 121a and an upper electrode 121c may be electrically connected to an upper portion of the encapsulation layer 123. Since the FBAR 121 is similar to that of FIG. 3B, a description thereof will be omitted. The encapsulation layer 123 may be located over the substrate SUB and the FBAR 121 not to expose the FBAR 121 to the outside. For example, the encapsulation layer 123 may be implemented as silicon or glass. Although not shown, the temperature sensor chip 120a may further include a molding layer located on the encapsulation layer 123.

Figure 9:
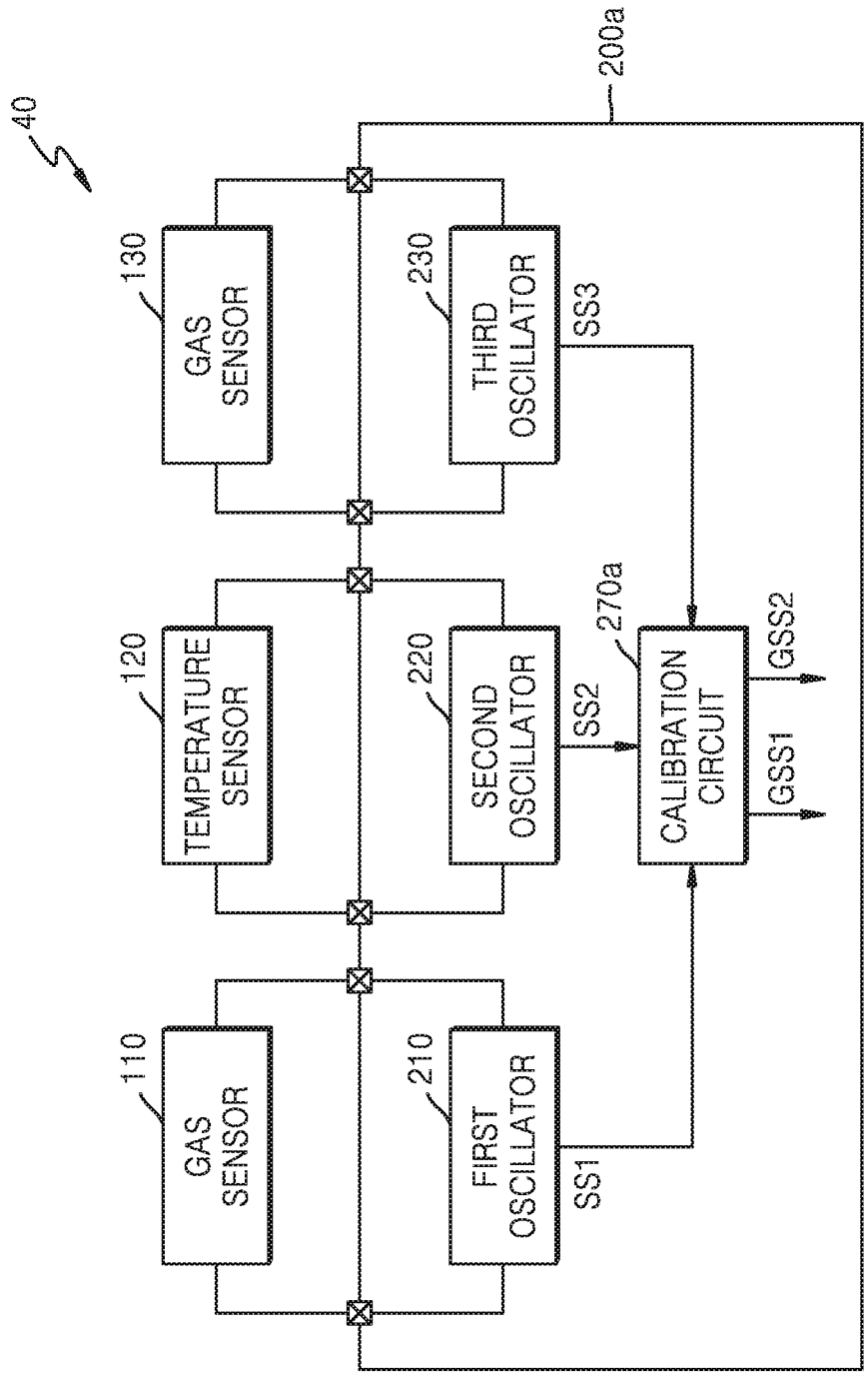
FIG. 9 is a block diagram of a gas sensing device according to an example embodiment.

FIG. 9 is a block diagram of a gas sensing device 40 according to an example embodiment. For example, the gas sensing device 40 may be a modified example of the gas sensing device 20 of FIG. 2.

Referring to FIG. 9, the gas sensing device 40 may include a gas sensor 110, a temperature sensor 120, a gas sensor 130, and a driving circuit chip 200a. The driving circuit chip 200a may include first to third oscillators 210, 220, and 230 and a calibration circuit 270a. As compared to the gas sensing device 20 of FIG. 2, the gas sensing device 40 may further include the gas sensor 130 and the third oscillator 230 corresponding thereto. As described above, according to the present example embodiment, the gas sensing device 40 may include a plurality of gas sensors (e.g., the gas sensors 110 and 130) and sense various gases. The same description as in FIG. 2 may be also applied to the present example embodiment, and repeated descriptions thereof will be omitted.

The gas sensor 130 may be implemented as an FBAR and have a resonance frequency according to a structure of the FBAR. In this case, the gas sensor 130 may be implemented to be substantially similar to the gas sensor 110. Hereinafter, the gas sensor 110 will be referred to as a "first gas sensor," and the gas sensor 130 will be referred to as a "second gas sensor." The first gas sensor 110 may include a first sensing film (e.g., 112 in FIG. 12) configured to sense a first target gas (also termed a first gas), and the second gas sensor 130 may include a second sensing film (e.g., 132 in FIG. 12) configured to sense a second target gas (also termed a second gas). In this case, the first sensing film and the second sensing film may include different materials.

The first oscillator 210 may output an oscillation signal (i.e., a first sensing signal SS1) having a frequency corresponding to a resonance frequency of the first gas sensor 110. The second oscillator 220 may output an oscillation signal (i.e., a second sensing signal SS2) having a frequency corresponding to a resonance frequency of the temperature sensor 120. The third oscillator 230 may output an oscillation signal (i.e., a third sensing signal SS3) having a frequency corresponding to the resonance frequency of the second gas sensor 130.

The calibration circuit 270a may calibrate the first sensing signal SS1 based on the second sensing signal SS2 and generate a first gas sensing signal GSS1. Also, the calibration circuit 270a may calibrate the third sensing signal SS3 based on the second sensing signal SS2 and generate a second gas sensing signal GSS2. As described above, according to the present example embodiment, the influence of a temperature may be removed from sensing results output by the first gas sensor 110 and the second gas sensor 130, thereby further improving precisions of sensing results of a first gas and a second gas.

Although FIG. 9 illustrates a case in which the calibration circuit 270a is included in the driving circuit chip 200a, example embodiments of the inventive concepts are not limited thereto. In some example embodiments, the calibration circuit 270a may be included in an AP or a microcontroller unit (MCU). Furthermore, in some example embodiments, the first to third sensing signals SS1 to SS3 may be provided to the AP or the MCU, and the AP or the MCU may calibrate the first sensing signal SS1 based on the second sensing signal SS2 and generate the first gas sensing signal GSS1 or calibrate the third sensing signal SS3 based on the second sensing signal SS2 and generate the second gas sensing signal GSS2.

Figure 10:
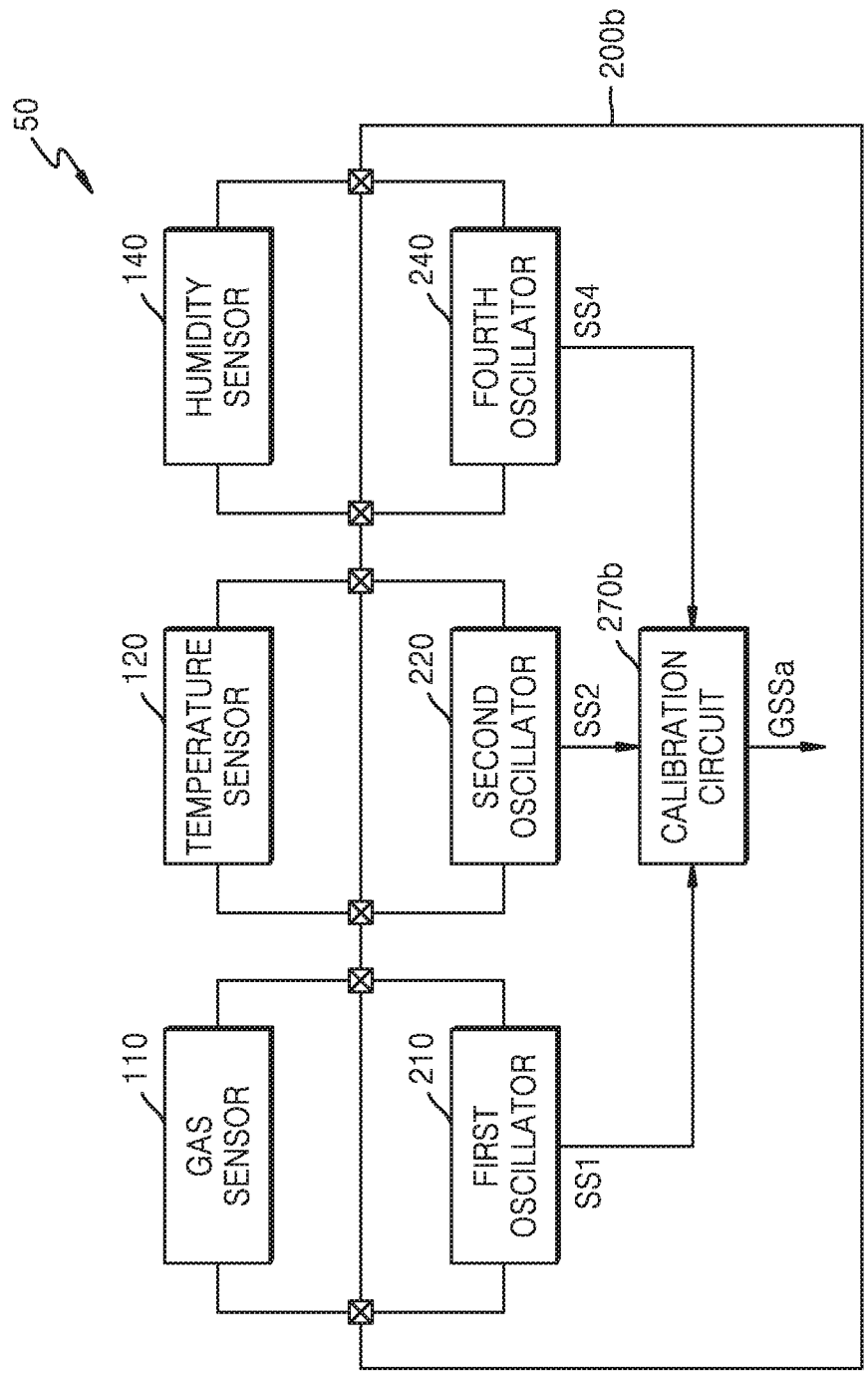
FIG. 10 is a block diagram of a gas sensing device according to an example embodiment.

FIG. 10 is a block diagram of a gas sensing device 50 according to an example embodiment. For example, the gas sensing device 50 may be another modified example of the gas sensing device 20 of FIG. 2.

Referring to FIG. 10, the gas sensing device 50 may include a first gas sensor 110, a temperature sensor 120, a humidity sensor 140, and a driving circuit chip 200b. The driving circuit chip 200b may include first and second oscillators 210 and 220, a fourth oscillator 240, and a calibration circuit 270b. As compared with the gas sensing device 20 of FIG. 2, the gas sensing device 50 may further include the humidity sensor 140 and the fourth oscillator 240 corresponding thereto. As described above, according to the present example embodiment, the gas sensing device 50 may include a plurality of environmental sensors including the temperature sensor 120 and the humidity sensor 140. Thus, the gas sensing device 50 may further improve a gas sensing precision. The same description as in FIG. 2 may be also applied to the present example embodiment, and repeated descriptions will be omitted.

The humidity sensor 140 may sense ambient humidity and be implemented as an FBAR and have a resonance frequency according to a structure of the FBAR. In this case, the humidity sensor 140 may be implemented to be substantially similar to the first gas sensor 110. The first gas sensor 110 may include a first sensing film (e.g., 112 in FIG. 12) configured to sense a first target gas (also termed a first gas), and the humidity sensor 140 may include a third sensing film (e.g., 142 in FIG. 12) configured to sense humidity. In this case, the first sensing film and the third sensing film may include different materials.

The first oscillator 210 may output an oscillation signal (i.e., a first sensing signal SS1) having a frequency corresponding to a resonance frequency of the first gas sensor 110. The second oscillator 220 may output an oscillation signal (i.e., a second sensing signal SS2) having a frequency corresponding to a resonance frequency of the temperature sensor 120. The fourth oscillator 240 may output an oscillation signal (i.e., a fourth sensing signal SS4) having a frequency corresponding to the resonance frequency of the humidity sensor 140.

The calibration circuit 270b may calibrate the first sensing signal SS1 based on the second sensing signal SS2 and the fourth sensing signal SS4 and generate a first gas sensing signal GSSa. A frequency $f_{GSSa}$ of the first gas sensing signal GSSa may be as shown in Equation 5:

$$f_{GSSa} = f_{SS1} - (A^* f_{SS2} + B^* f_{SS4} + E) \qquad \text{Equation 5}$$

wherein $f_{SS1}$ denotes a frequency of the first sensing signal SS1, A denotes a temperature coefficient, $f_{SS2}$ denotes a frequency of the second sensing signal SS2, B denotes a humidity coefficient, and $f_{SS4}$ denotes a frequency of the fourth sensing signal SS4.

As described above, according to the present example embodiment, the influence of temperature and humidity may be removed from a sensing result output by the first gas sensor 110, thereby further improving the sensing result of a first gas.

Although FIG. 10 illustrates a case in which the calibration circuit 270b is included in the driving circuit chip 200b, example embodiments of the inventive concepts are not limited thereto. In some example embodiments, the calibration circuit 270b may be included in an AP or an MCU. Furthermore, in some embodiments, the first and second sensing signals SS1 and SS2 and the fourth sensing signal SS4 may be provided to the AP or the MCU, and the AP or the MCU may calibrate the first sensing signal SS1 based on the second sensing signal SS2 and the fourth sensing signal SS4 and generate the first gas sensing signal GSSa.

Figure 11:
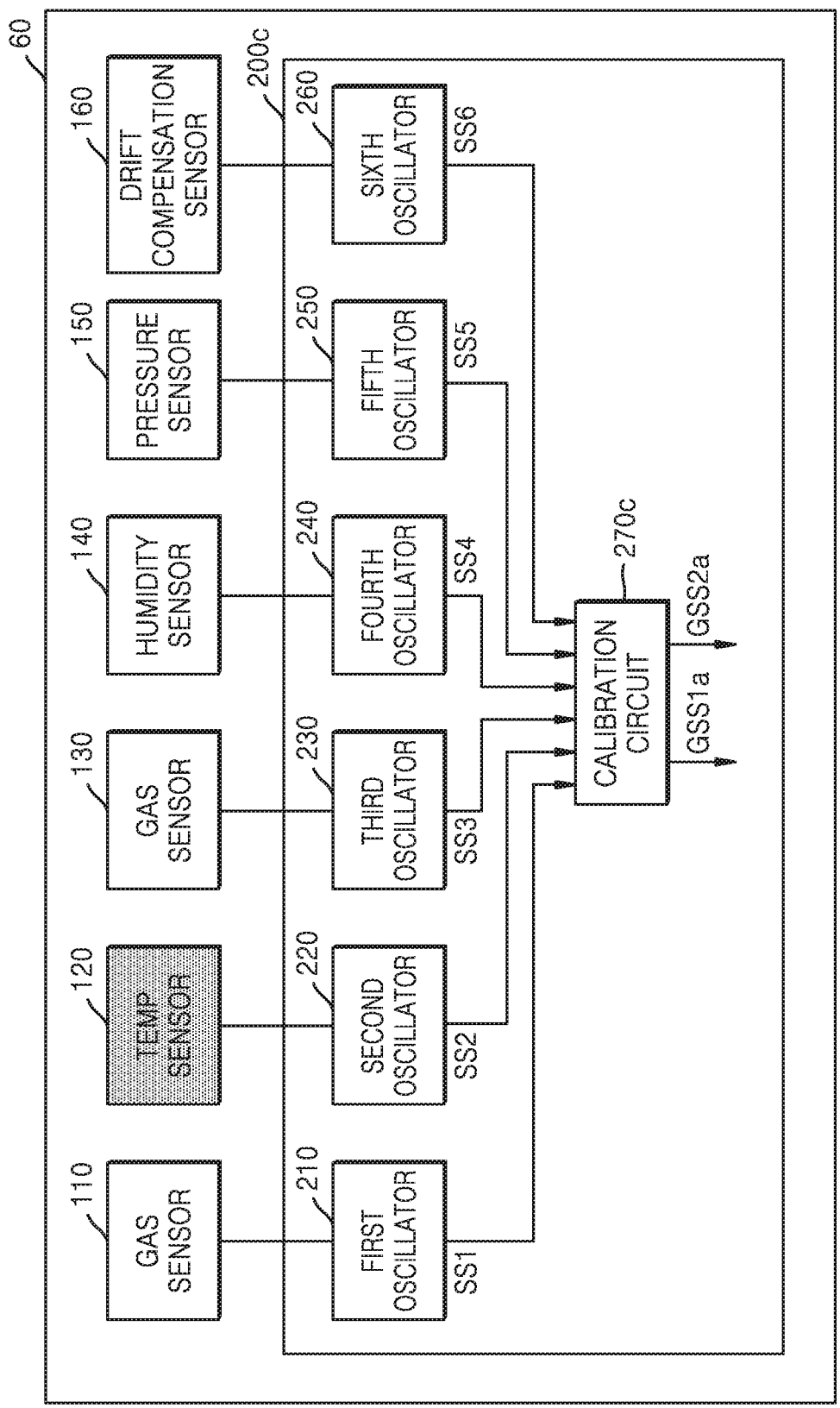
FIG. 11 is a block diagram of a gas sensing device according to an example embodiment.

FIG. 11 is a block diagram of a gas sensing device 60 according to an example embodiment.

Referring to FIG. 11, the gas sensing device 60 may include a first gas sensor 110, a temperature sensor 120, a second gas sensor 130, a humidity sensor 140, a pressure sensor 150, and a drift compensation sensor 160. Here, the temperature sensor 120, the humidity sensor 140, the pressure sensor 150, and the drift compensation sensor 160 may be environmental sensors. In some example embodiments, the gas sensing device 60 may further include a plurality of gas sensors or a plurality of environmental sensors. For example, the gas sensing device 60 may further include an optical sensor. In some example embodiments, the gas sensing device 60 may include at least one of the temperature sensor 120, the humidity sensor 140, the pressure sensor 150, and the drift compensation sensor 160. In some example embodiments, the gas sensing device 60 may include one of the first and second gas sensors 110 and 130.

In the gas sensing device 60, each of the first gas sensor 110, the temperature sensor 120, the second gas sensor 130, the humidity sensor 140, the pressure sensor 150, and the drift compensation sensor 160 may be implemented as an FBAR and located on a driving circuit chip 200c. The first gas sensor 110 may sense a first gas, and the second gas sensor 130 may sense a second gas. In an example embodiment, first and second gas sensors 110 and 130 may be formed on respectively different wafers and thus, implemented as individual semiconductor dies or semiconductor chips. In an example embodiment, the first and second gas sensors 110 and 130 may be formed on the same wafer and thus, implemented as a single semiconductor die or a single semiconductor chip.

The humidity sensor 140 may sense ambient humidity and output a humidity sensing result. The pressure sensor 150 may sense an atmospheric pressure and output an atmospheric pressure sensing result. For example, the pressure sensor 150 may have an encapsulation-type cavity between a substrate and an FBAR and sense an atmospheric pressure. The drift compensation sensor 160 may sense the aging of the FBAR and output a drift sensing result. For example, the drift compensation sensor 160 may include an FBAR with which a sensing film is not coated. Since a baseline is movable from a sensing result due to the aging of the FBAR, the influence of the aging of the FBAR may be removed from a gas sensing result using the drift sensing result.

The driving circuit chip 200c may include first to sixth oscillators 210 to 260, which may respectively correspond to the first gas sensor 110, the temperature sensor 120, the second gas sensor 130, the humidity sensor 140, the pressure sensor 150, and the drift compensation sensor 160. The first oscillator 210 may generate a first sensing signal SS1 in response to a variation in resonance frequency of the first gas sensor 110. The second oscillator 220 may generate a second sensing signal SS2 in response to a variation in resonance frequency of the temperature sensor 120. The third oscillator 230 may generate a third sensing signal SS3 in response to a variation in resonance frequency of the second gas sensor 130. Also, the fourth oscillator 240 may generate a fourth sensing signal SS4 in response to a variation in resonance frequency of the humidity sensor 140. The fifth oscillator 250 may generate a fifth sensing signal SS5 in response to a variation in resonance frequency of the pressure sensor 150. The sixth oscillator 260 may generate a sixth sensing signal SS6 in response to a variation in resonance frequency of the drift compensation sensor 160.

Furthermore, the driving circuit chip 200c may further include a calibration circuit 270c. The calibration circuit 270c may calibrate the first sensing signal SS1 based on the second and fourth to sixth sensing signals SS2, SS4, SS5, and SS6 and generate a first gas sensing signal GSS1a. A frequency $f_{GSS1a}$ of the first gas sensing signal GSS1a may be as shown in Equation 6:

$$f_{GSS1a} = f_{SS1} - (A^* f_{SS2} + B^* f_{SS4} + C^* f_{SS5} + F^* f_{SS6} + E)$$   Equation 6 wherein $f_{SS1}$ denotes a frequency of the first sensing signal SS1, C denotes a pressure coefficient, and $f_{SS5}$ denotes a frequency of the fifth sensing signal SS5. Also, F denotes a drift coefficient, and $f_{SS6}$ denotes a frequency of the sixth sensing signal SS6.

Furthermore, the calibration circuit 270c may calibrate the third sensing signal SS3 based on the second and fourth to sixth sensing signals SS2, SS4, SS5, and SS6 and generate a second gas sensing signal GSS2a. In this case, a frequency fGSS2a of the second gas sensing signal GSS2a may be as shown in Equation 7:

$$f_{GSS2a} = f_{SS3} - (A^* f_{SS2} + B^* f_{SS4} + C^* f_{SS5} + F^* f_{SS6} + E)$$   Equation 7

As described above, according to the present example embodiment, the influence of temperature, humidity, atmospheric pressure, and drift may be removed from sensing results output by the first and second gas sensors 110 and 130, thereby further improving precisions of sensing results of the first and second gases.

Although FIG. 11 illustrates a case in which the calibration circuit 270c is included in the driving circuit chip 200c, example embodiments of the inventive concepts are not limited thereto. In some example embodiments, the calibration circuit 270c may be included in an AP or an MCU. Furthermore, in some example embodiments, the first to sixth sensing signals SS1 to SS6 may be provided to the AP or the MCU, and the AP or the MCU may calibrate the first sensing signal SS1 based on the second and fourth to sixth sensing signals SS2, SS4, SS5, and SS6 and generate the first gas sensing signal GSS1a or calibrate the third sensing signal SS3 based on the second and fourth to sixth sensing signals SS2, SS4, SS5, and SS6 and generate the second gas sensing signal GSS2a.

Figure 12:
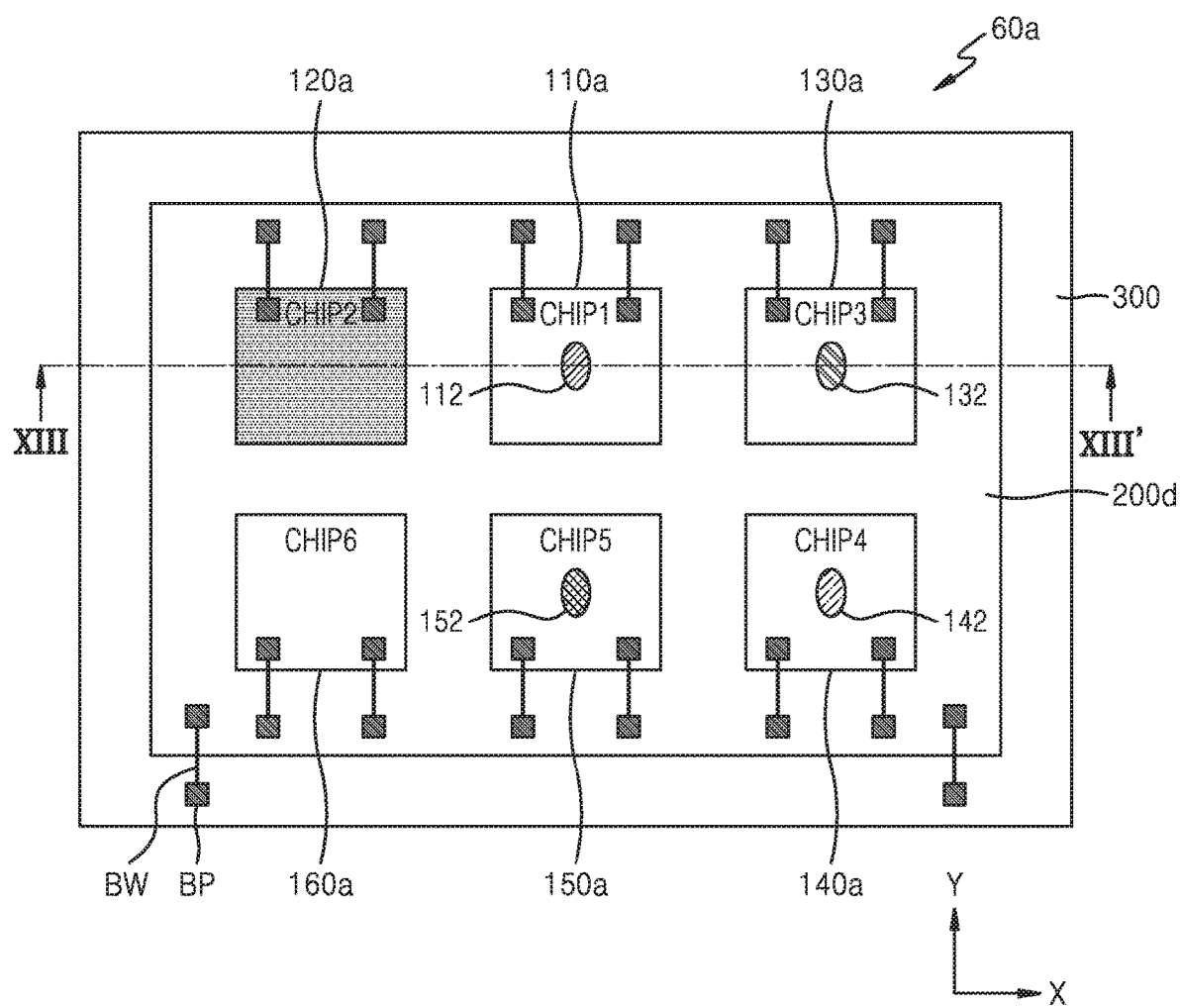
FIG. 12 is a diagram of an embodied example of the gas sensing device of FIG. 11, according to an example embodiment.
Figure 13:
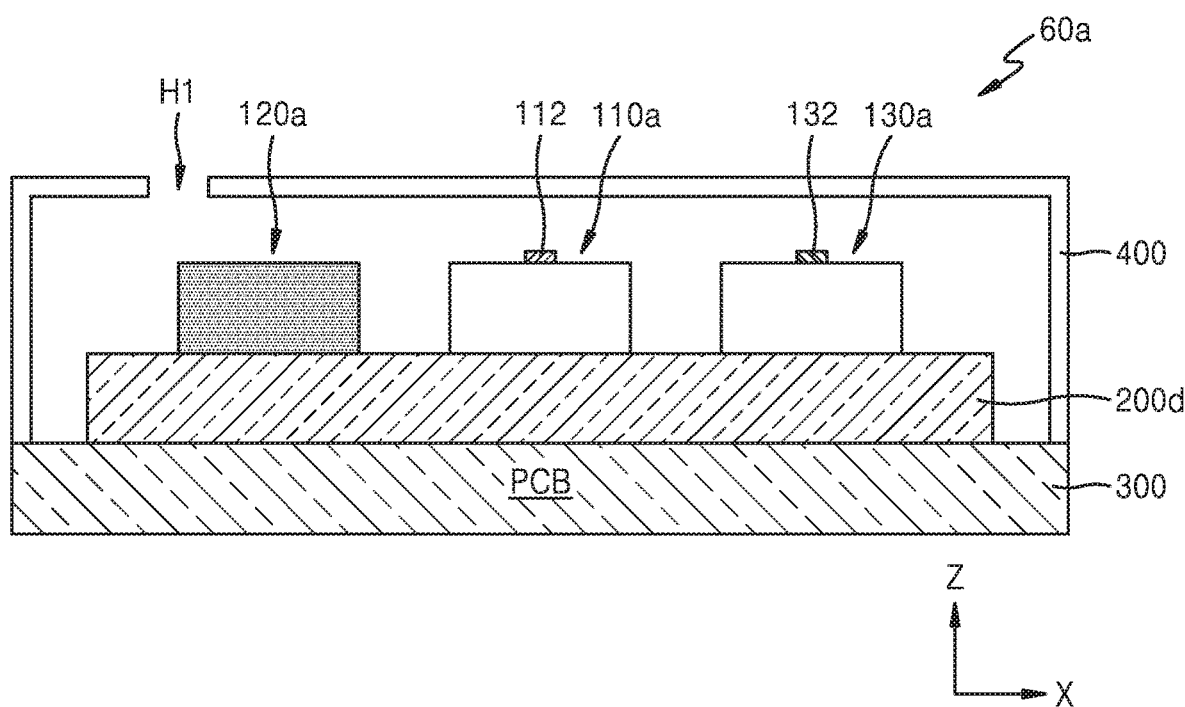
FIG. 13 is a cross-sectional view taken along a line XIII-XIII' of FIG. 12, according to an example embodiment.

FIG. 12 is a diagram of a gas sensing device 60a according to an example embodiment, and FIG. 13 is a cross-sectional view taken along a line XIII-XIII' of FIG. 12, according to an embodiment.

Referring to FIGS. 12 and 13, the gas sensing device 60a may include a substrate 300, a driving circuit chip 200d located on the substrate 300, and a first sensor chip CHIP1 or 110a, a second sensor chip CHIP2 or 120a, a third sensor chip CHIP3 or 130a, a fourth sensor chip CHIP4 or 140a, a fifth sensor chip CHIP5 or 150a, and a sixth sensor chip CHIP6 or 160a, which may be located on the driving circuit chip 200d. The gas sensing device 60a may correspond to a modified example of the gas sensing device 20a shown in FIGS. 5 to 7, and the same description as in FIGS. 5 to 7 may be also applied to the present embodiment.

The first sensor chip 110a, the second sensor chip 120a, the third sensor chip 130a, the fourth sensor chip 140a, the fifth sensor chip 150a, and the sixth sensor chip 160a may respectively correspond to embodied examples of the first gas sensor 110, the temperature sensor 120, the second gas sensor 130, the humidity sensor 140, the pressure sensor 150, and the drift compensation sensor 160 of FIG. 11. Hereinafter, the first sensor chip 110a, the second sensor chip 120a, the third sensor chip 130a, the fourth sensor chip 140a, the fifth sensor chip 150a, and the sixth sensor chip 160a will be referred to as a first gas sensor chip 110a, a temperature sensor chip 120a, a second gas sensor chip 130a, a humidity sensor chip 140a, a pressure sensor chip 150a, and a drift compensation sensor chip 160a, respectively. The driving circuit chip 200d may correspond to an embodied example of the driving circuit chip 200c of FIG. 11.

The temperature sensor chip 120a, the first gas sensor chip 110a, the second gas sensor chip 130a, the humidity sensor chip 140a, the pressure sensor chip 150a, and the drift compensation sensor chip 160a may be formed on respectively different wafers and thus, implemented as individual semiconductor dies or individual semiconductor chips. In this case, each of the temperature sensor chip 120a, the first gas sensor chip 110a, the second gas sensor chip 130a, the humidity sensor chip 140a, the pressure sensor chip 150a, and the drift compensation sensor chip 160a may include an FBAR and thus, will be referred to as an "FBAR sensor chip."

The temperature sensor chip 120a may have an encapsulation structure not to expose the FBAR to the outside. Thus, the temperature sensor chip 120a may include an encapsulation layer. The temperature sensor chip 120a may be implemented to be substantially similar to that of FIG. 8B and thus, a detailed description thereof will be omitted. The first gas sensor chip 110a may include a first sensing film 112 with which the FBAR is coated, and the first sensing film 112 may be exposed to the outside and sense a first gas. The second gas sensor chip 130a may include a second sensing film 132 with which the FBAR is coated, and the second sensing film 132 may be exposed to the outside and sense a second gas.

The humidity sensor chip 140a may include a third sensing film 142 with which the FBAR is coated, and the third sensing film 142 may be exposed to the outside and sense humidity. The pressure sensor chip 150a may include a fourth sensing film 152 with which the FBAR is coated, and an encapsulation-type cavity located under the FBAR and sense an atmospheric pressure. The drift compensation sensor chip 160a may be implemented not to include a sensing film to compensate a frequency variation caused by the aging of the FBAR.

Figure 14:
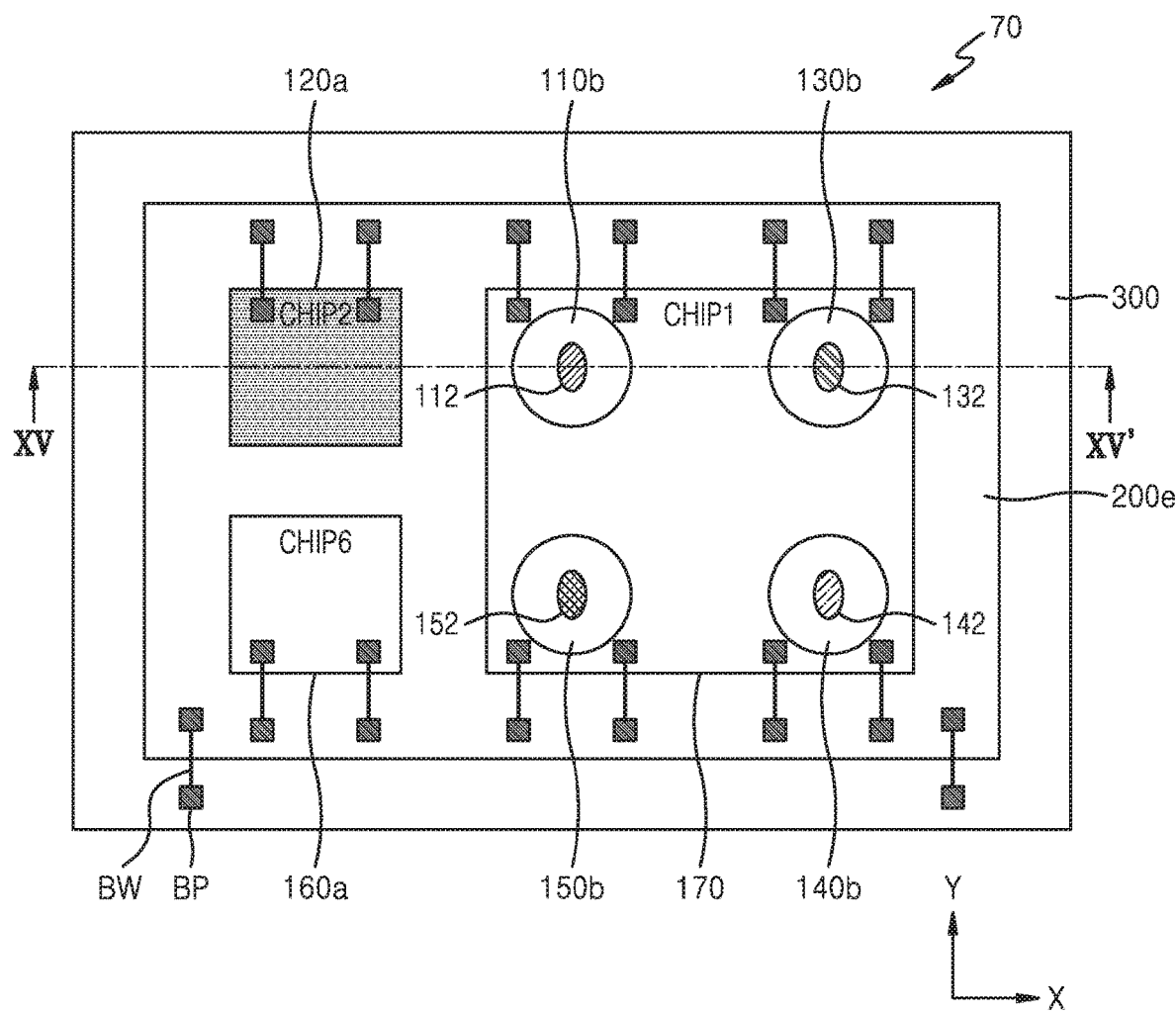
FIG. 14 is a diagram of an embodied example of the gas sensing device of FIG. 11, according to an example embodiment.
Figure 15:
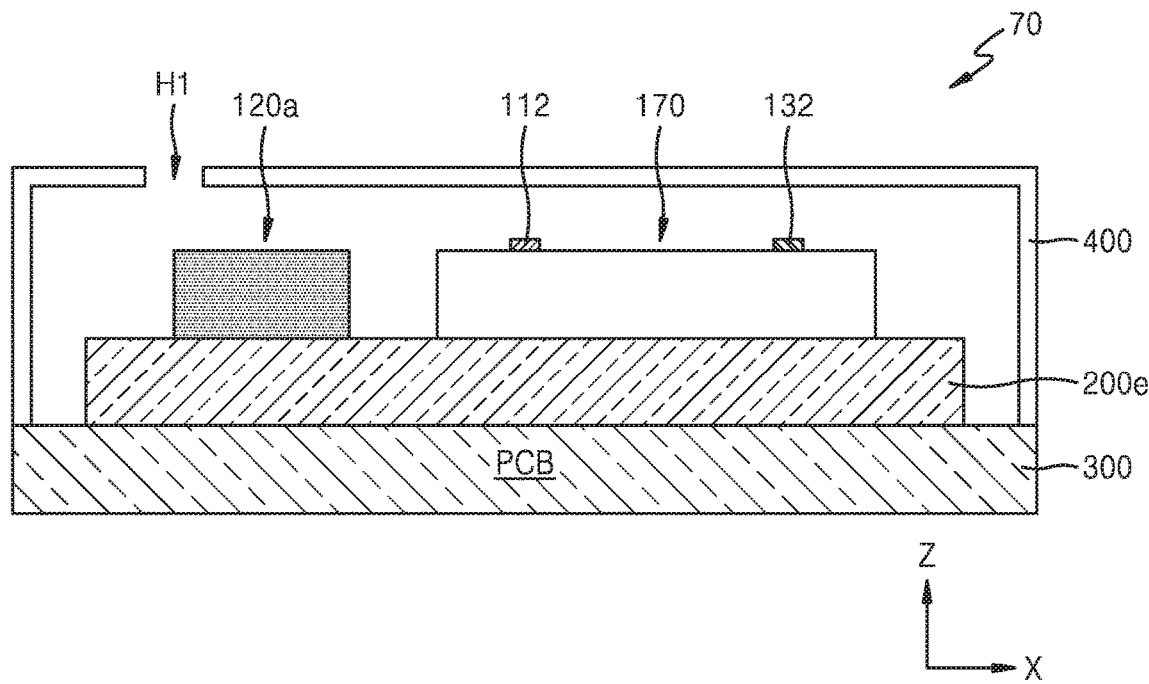
FIG. 15 is a cross-sectional view taken along a line XV-XV' of FIG. 14, according to an example embodiment.

FIG. 14 is a diagram of a gas sensing device 70 according to an example embodiment, and FIG. 15 is a cross-sectional view taken along a line XV-XV' of FIG. 14, according to an example embodiment.

Referring to FIGS. 14 and 15, the gas sensing device 70 may include a substrate 300, a driving circuit chip 200e located on the substrate 300, and a sensor chip CHIP1 or 170, a temperature sensor chip CHIP2 or 120a, and a drift sensor chip CHIP6 or 160a, which may be located on the driving circuit chip 200e. The sensor chip 170 may include a first gas sensor 110b, a second gas sensor 130b, a humidity sensor 140b, and a pressure sensor 150b. The gas sensing device 70 may correspond to another modified example of the gas sensing device 20a shown in FIGS. 5 to 7. The same description as in FIGS. 5 to 7 may be also applied to the present embodiment.

According to the present example embodiment, FBAR sensors having upper portions coated with a sensing film may be implemented as single sensor chips. The first gas sensor 110b may include a first sensing film 112, and the second gas sensor 130b may include a second sensing film 132. The humidity sensor 140b may include a third sensing film 142, and the pressure sensor 150b may include a fourth sensing film 152. Accordingly, the first and second gas sensors 110b and 130b, the humidity sensor 140b, and the pressure sensor 150b may be formed on the same wafer and implemented as the sensor chip 170. In this case, the temperature sensor chip 120a and the drift sensor chip 160a, which do not include sensing films, may be implemented as individual sensor chips.

However, example embodiments of the inventive concepts are not limited thereto, and at least one of the first gas sensor 110b, the second gas sensor 130b, the humidity sensor 140b, and the pressure sensor 150b may be implemented as an individual die or chip. For example, the first gas sensor 110b, the second gas sensor 130b, and the humidity sensor 140b may be implemented as one chip, and the pressure sensor 150b may be implemented as another chip. In some embodiments, the first and second gas sensors 110b and 130b may be formed on a first wafer and implemented as one chip, while the humidity sensor 140b and the pressure sensor 150b may be formed on a second wafer and implemented as another chip. In some embodiments, the sensor chip 170 may further include various gas sensors and various environmental sensors.

Figure 16:
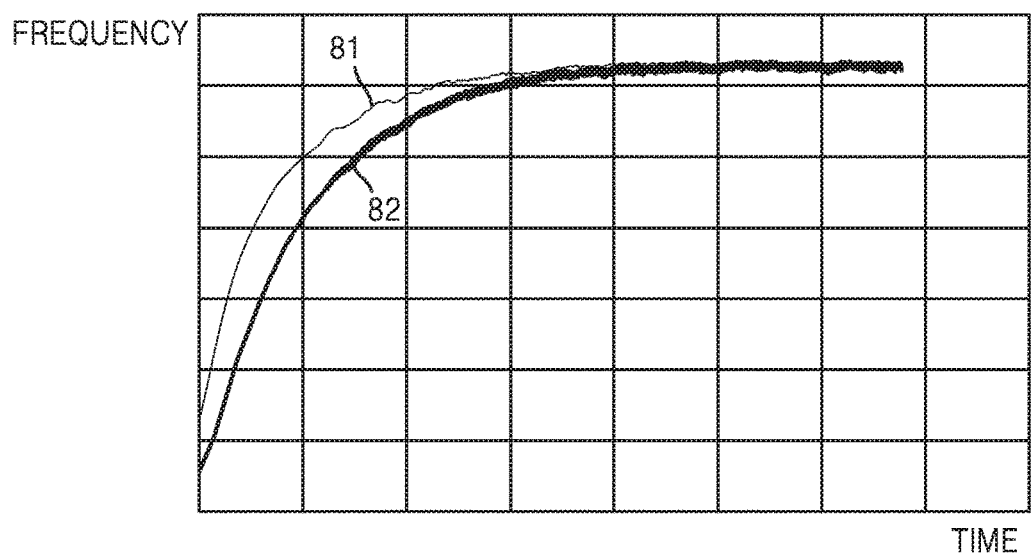
FIG. 16 is a graph showing results obtained by compensating an environmental factor in a gas sensing device according to example embodiments.

FIG. 16 is a graph showing a sensing measurement result and a sensing calculation result of an environmental sensor in a gas sensing device according to example embodiments.

Referring to FIG. 16, the abscissa denotes time, and the ordinate denotes frequency. A first curve 81 and a second curve 82 denote frequency variations relative to time in a situation in which a target gas is not sensed. The first curve 81 denotes the sensing measurement result of the environmental sensor in the situation in which the target gas is not sensed. For example, the first curve 81 may correspond to the second sensing result of the environmental sensor ES of FIG. 1 (i.e., $f_{OUT2}$). Meanwhile, the second curve 82 denotes the sensing calculation result of the environmental sensor in the situation in which the target gas is not sensed.

In an example embodiment, when the environmental sensor includes a temperature sensor, a humidity sensor, a pressure sensor, and an illuminance sensor, the sensing measurement result of the environmental sensor may correspond to the first curve 81, and the sensing calculation result of the environmental sensor may be as shown in Equation 8:

$$f(\text{environment\_calculation}) = A^*f_T + B^*f_H + C^*f_P + D^*f_U + E \quad \text{Equation 8}$$

wherein f(environment_calculation) corresponds to the second curve 82, A denotes a temperature coefficient, B denotes a humidity coefficient, C denotes a pressure coefficient, D denotes an illuminance coefficient, and E denotes a constant. Also, $f_T$ denotes an output of the temperature sensor (e.g., 120 in FIG. 11), $f_H$ denotes an output of the humidity sensor (e.g., 140 in FIG. 11), $f_P$ denotes an output of the pressure sensor (e.g., 150 in FIG. 11), and $f_U$ denotes an output of the illuminance sensor. The temperature coefficient A, the humidity coefficient B, the pressure coefficient C, the illuminance coefficient D, and the constant E may be calculated due to a plurality of sensing operations. As described above, the environmental measurement result (refer to first curve 81) and the environmental calculation result (refer to second curve 82) may have substantially similar frequencies with respect to time.

However, example embodiments of the inventive concepts are not limited thereto. In some example embodiments, the compensation of the environmental sensor may have a linear relationship and a non-linear relationship. In an example embodiment, when the environmental sensor includes the temperature sensor, the humidity sensor, the pressure sensor, and the illuminance sensor, a sensing result of the environmental sensor may non-linearly reflect a sensing result of each of the temperature sensor, the humidity sensor, the pressure sensor, and the illuminance sensor. f(environment) may be implemented by various algorithms that are based on various outputs of the environmental sensor. Also, f(environment) may be implemented by an algorithm using machine learning that is based on the various outputs of the environmental sensor.

According to the first and second curves 81 and 82, it can be seen that a sensing result of a gas sensor is substantially similar to the sensing result of the environmental sensor in a situation in which the target gas is not sensed. Accordingly, the sensing result of the gas sensor may be compensated using the sensing result of the environmental sensor, thereby improving a gas sensing precision.

Figure 17A:
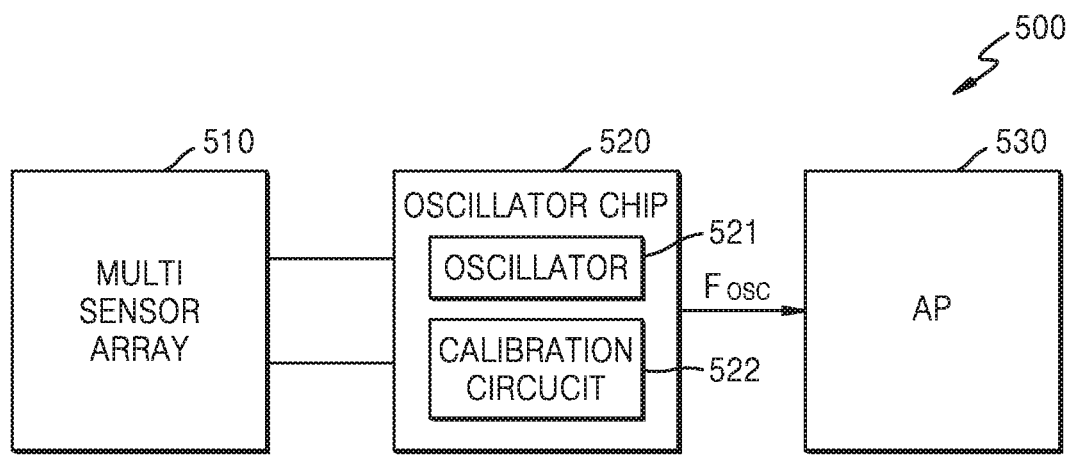
FIGS. 17A to 17C are block diagrams of examples of electronic devices according to example embodiments.

FIG. 17A is a block diagram an electronic device 500 as an example of an electronic device according to an example embodiment.

Referring to FIG. 17A, the electronic device 500 may include a multi-sensor array 510, an oscillator chip 520, and an AP 530. The multi-sensor array 510 may include a plurality of FBAR sensors, which may be implemented as individual sensor chips or dies. For example, the multi-sensor array 510 may include at least two of the first gas sensor 110, the temperature sensor 120, the second gas sensor 130, the humidity sensor 140, the pressure sensor 150, and the drift compensation sensor 160 of FIG. 11.

The oscillator chip 520 may include an oscillator 521 and a calibration circuit 522. For example, the oscillator 521 may include a plurality of oscillators in equal number to the FBAR sensors included in the multi-sensor array 510. The plurality of oscillators may output oscillation signals having frequencies corresponding to resonance frequencies of the FBAR sensors corresponding thereto. For example, the oscillator 521 may include first to sixth oscillators 210 to 260 of FIG. 11. The calibration circuit 522 may calibrate an environment sensing result in a gas sensing result. Thus, the oscillator chip 520 may calibrate an environmental factor and output an oscillation signal $F_{OSC}$. As an example, the oscillation signal $F_{OSC}$ output by the oscillator chip 520 may be provided to the AP 530.

Figure 17B:
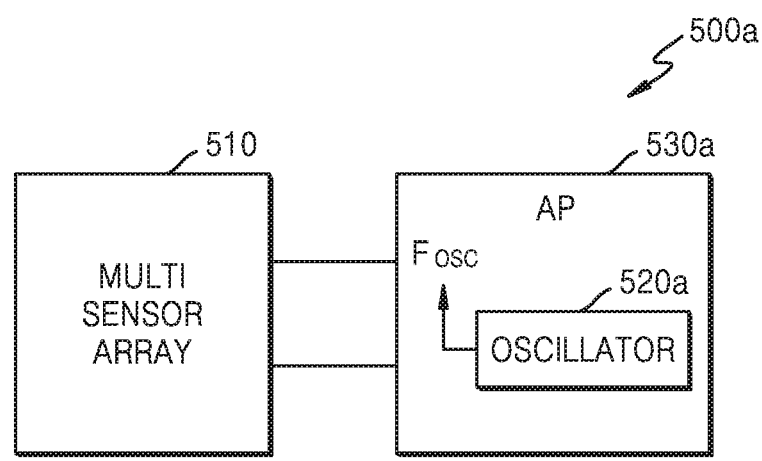

FIG. 17B is a block diagram of an electronic device 500a as another example of an electronic device according to an example embodiment.

Referring to FIG. 17B, the electronic device 500a may include a multi-sensor array 510 and an AP 530a. The electronic device 500a may correspond to a modified example of the electronic device 500 of FIG. 17A, and a repeated description thereof will be omitted. Various circuits (e.g., an oscillation circuit and a calibration circuit) included in the oscillator 520a may be implemented in the AP 530a, and the oscillator 520a may be connected to the multi-sensor array 510 and output an oscillation signal $F_{OSC}$.

Figure 17C:
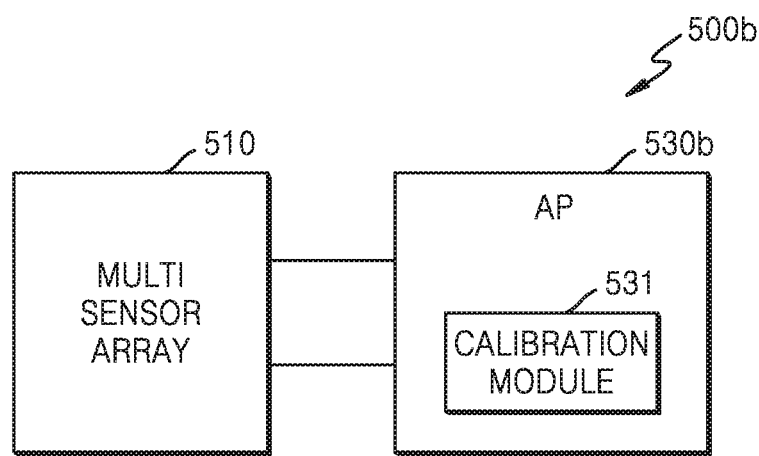

FIG. 17C is a block diagram of an electronic device 500b as another example according to an example embodiment.

Referring to FIG. 17C, the electronic device 500b may correspond to a modified example of the electronic device 500 of FIG. 17A, and a repeated description thereof will be omitted. An AP 530b may receive various sensing signals from a multi-sensor array 510. Also, the AP 530b may include a calibration module 531, which may calibrate a gas sensing result based on various received sensing signals and generate a gas sensing signal. For example, the calibration module 531 may be implemented by a processor executing software and loaded on a memory.

Figure 18:
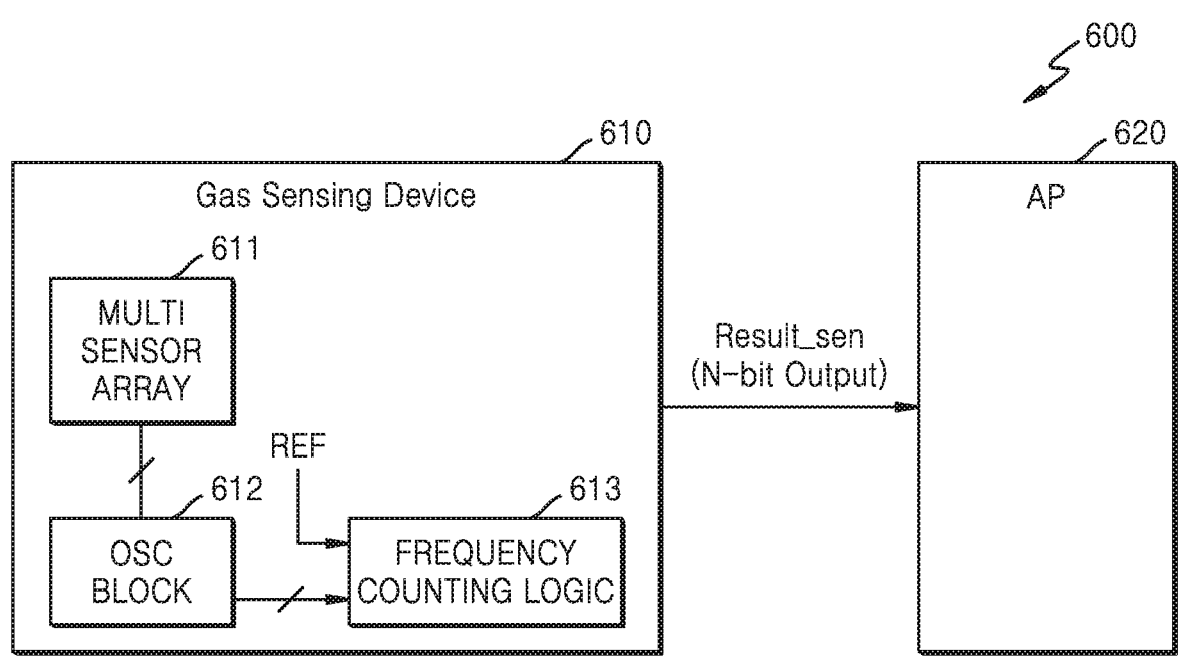
FIG. 18 is a block diagram of a gas sensing system according to an example embodiment.

FIG. 18 is a block diagram of a gas sensing system 600 according to an example embodiment.

Referring to FIG. 18, the gas sensing system 600 may include a gas sensing device 610 and an AP 620. The gas sensing device 610 may include a multi-sensor array 611, an oscillator block (hereinafter, an OSC block) 612 including at least one oscillator, and a frequency counting logic 613 configured to generate a gas sensing result Result_sen based on an operation of counting oscillation signals generated by the oscillators. In some example embodiments, the gas sensing device 610 may further include a noise reduction circuit.

The multi-sensor array 611 may include various kinds of sensors. According to the above-described embodiment, the multi-sensor array 611 may include FBAR gas sensors configured to sense at least one kind of gases and at least one FBAR environmental sensor configured to compensate environmental factors. In some example embodiments, the multi-sensor array 611 may include various other kinds of resonators. As an example, the multi-sensor array 611 may include various kinds of resonators, such as a bulk acoustic wave resonator (BAW), a surface acoustic wave resonator (SAW), and a solidly mounted resonator (SMR).

The OSC block 612 may include a plurality of oscillators, which may be respectively connected to the sensors included in the multi-sensor array 611. In an example embodiment, a calibration circuit (e.g., 270 in FIG. 2) may be included in the OSC block 612. The calibration circuit may calibrate sensing results of the FBAR gas sensors based on a sensing result of the FBAR environmental sensor and generate a gas sensing signal (i.e., a compensated oscillation signal). However, example embodiments of the inventive concepts are not limited thereto. In some example embodiments, the calibration circuit may be included in the frequency counting logic 613.

The frequency counting logic 613 may generate a gas sensing result Result_sen based on an operation of counting a plurality of oscillation signals or compensated oscillation signals, which are generated by the OSC block 612. According to an example embodiment, the frequency counting logic 613 may perform an operation of counting a plurality of oscillation signals or compensated oscillation signals using a reference signal REF. A counting result may be output as the above-described gas sensing result Result_sen. For example, the gas sensing result Result_sen may correspond to a digital code N-bit Output having a desired (or, alternatively, a predetermined) number of bits.

The gas sensing result Result_sen having the digital code N-bit Output may be used by an external device. For example, when the gas sensing device 610 is adopted for a mobile device (e.g., a smartphone), the AP 620 may be included in the mobile device and control the overall operation of the mobile device, and the gas sensing result Result_sen may be provided by the gas sensing device 610 to the AP 620. The AP 620 may perform an operation using the gas sensing result Result_sen and calculate the concentrations of sensed gases. Also, the AP 620 may process the gas sensing result Result_sen and perform various operations, for example, an operation of outputting various screens related to a gas sensing operation to a display.

In a modified example embodiment, an additional processing operation using the digital code N-bit Output may be performed in the gas sensing device 610. For example, various operations, such as an operation of calculating the concentrations of the above-described gases, may be performed in the gas sensing device 610.

Figure 19:
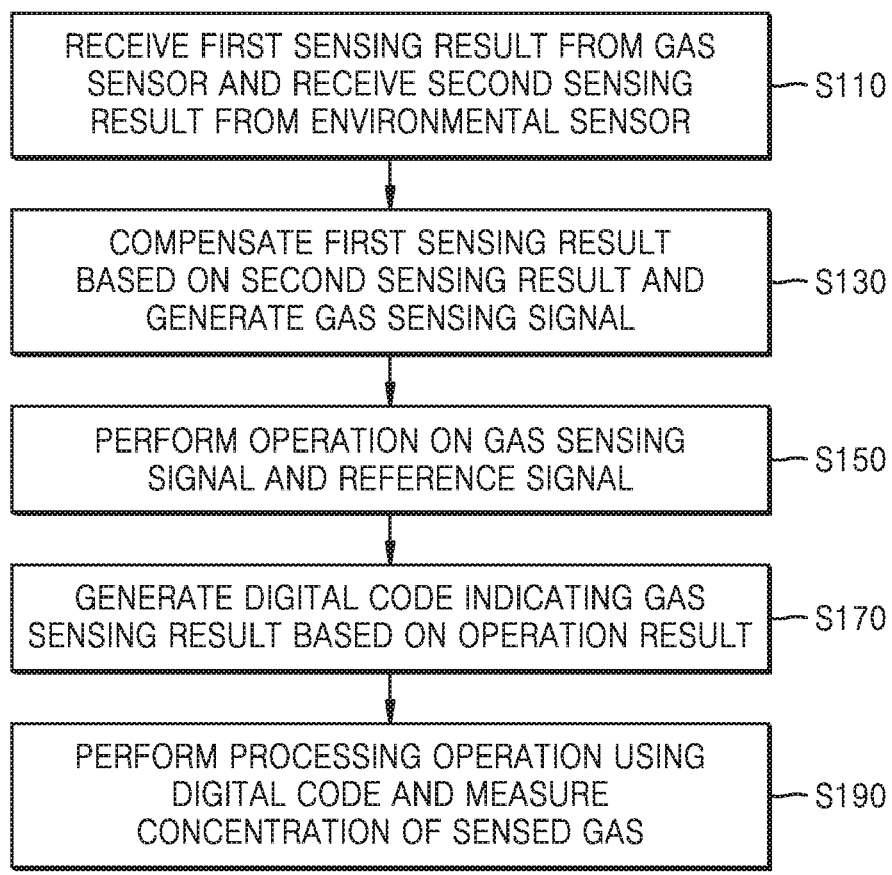
FIG. 19 is a flowchart of a gas sensing method of a gas sensing system according to an example embodiment.

FIG. 19 is a flowchart of a gas sensing method of a gas sensing system according to an example embodiment.

Referring to FIG. 19, the gas sensing method according to the present example embodiment may include, for example, operations performed in a temporal sequence in the gas sensing system 600 of FIG. 18. Hereinafter, the gas sensing method will be described with reference to FIGS. 18 and 19.

The gas sensing system 600 may include a plurality of FBAR sensors, each of which may have an intrinsic resonance frequency. The plurality of FBAR sensors may include at least one gas sensor and at least one environmental sensor. The gas sensing system 600 may further include a plurality of oscillators corresponding respectively to the plurality of FBAR sensors.

In operation S110, the gas sensing system 600 may receive a first sensing result from the gas sensor and receive a second sensing result from the environmental sensor. The oscillators may generate oscillation signals indicating results obtained by sensing different kinds of gases, according to characteristics of polymers included in the plurality of FBAR sensors.

In operation S130, the gas sensing system 600 may compensate the first sensing result based on the second sensing result and generate a gas sensing signal.

In operation S150, the gas sensing system 600 may perform an operation on the gas sensing signal and a reference signal REF.

For example, in an example embodiment, the reference signal REF may be an initial frequency value of each sensor, and an operation using the initial frequency value of each sensor may be performed on each of a plurality of oscillation signals generated by the plurality of oscillators or a compensated oscillation signal (i.e., the gas sensing signal). Various operations using the initial frequency value of each sensor and the gas sensing signal may be performed. For example, an AND/OR operation may be performed on the initial frequency value of each sensor and the gas sensing signal, and a counting operation of counting a signal (i.e., a counter input) output as a result of the AND/OR operation may be performed.

In operation S170, the gas sensing system 600 may generate a digital code N-bit Output indicating a gas sensing result based on the operation result. The digital code N-bit Output may include a value related to a frequency ratio of the oscillation signal or the gas sensing signal to the reference signal REF. The gas sensing system 600 may output the gas sensing result corresponding to the digital code N-bit Output.

In operation S190, the gas sensing system 600 may perform a processing operation using the digital code N-bit Output and measure the concentration of a sensed gas.

For example, the gas sensing result output by the gas sensing system 600 may be used using various methods. According to an example embodiment, the gas sensing result may be provided to a semiconductor chip (e.g., an AP) included in a device adopting the gas sensing system 600. The AP may perform a processing operation using the digital code N-bit Output and perform various functions related to a gas sensing operation. According to an example embodiment, the concentration of the sensed gas may be measured.

Example embodiments of the inventive concepts are disclosed in the above description and the drawings. Although specific terms are employed, they are used in a generic and descriptive sense only and not for purposes of limitation. It will be understood by those of ordinary skill in the art that various changes in form and details may be made to the disclosed example embodiments without departing from the spirit and scope of the example embodiments of the inventive concepts as defined by the following claims.

What is claimed is:

1. A gas sensing system comprising:
    a driving circuit chip;
    a gas sensor on the driving circuit chip, the gas sensor including a first resonator and a first sensing film, the first sensing film being located on the first resonator such that the first sensing film is exposed to an outside of the gas sensing system, the first sensing film configured to sense a first gas to generate a gas sensing result;
    a temperature sensor on the driving circuit chip, the temperature sensor including a second resonator and an encapsulation layer, the encapsulation layer being located above the second resonator and encapsulating the second resonator such that an air cavity is between the second resonator and the encapsulation layer and the second resonator is not exposed to the outside of the gas sensing system, the temperature sensor configured to sense temperature to generate a temperature sensing result; and
    a humidity sensor on the driving circuit chip, the humidity sensor including a third resonator, the humidity sensor configured to sense humidity to generate a humidity sensing result, wherein
    the gas sensing system is configured to determine a frequency variation between a first frequency of the gas sensing result of the gas sensor and a second frequency of at least one of the temperature sensing result and the humidity sensing result, and to adjust the gas sensing result of the gas sensor based on the frequency variation to generate a gas sensing signal.

2. The gas sensing system of claim 1, wherein the driving circuit chip comprises:
    a calibration circuit configured to adjust the gas sensing result of the gas sensor based on the frequency variation to generate the gas sensing signal.

3. The gas sensing system of claim 2, wherein the calibration circuit is configured to,
    determine the frequency variation by subtracting a variation in the second frequency of the at least one of the temperature sensing result and the humidity sensing result from a variation in the first frequency of the gas sensing result, and
    generate the gas sensing signal based on the frequency variation.

4. The gas sensing system of claim 1, further comprising:
    an application processor configured to,
        receive a first sensing signal from the gas sensor,
        receive a second sensing signal from the temperature sensor,
        receive a third sensing signal from the humidity sensor, and
        adjust the first sensing signal based on at least one of the second sensing signal and the third sensing signal to generate the gas sensing signal.

5. The gas sensing system of claim 1, further comprising:
    a cloud server configured to,
        receive a first sensing signal from the gas sensor,
        receive a second sensing signal from the temperature sensor,
        receive a third sensing signal from the humidity sensor, and
        adjust the first sensing signal based on at least one of the second sensing signal and the third sensing signal to generate the gas sensing signal.

6. The gas sensing system of claim 1, wherein the gas sensor, the temperature sensor, and the humidity sensor are implemented as separate sensor chips.

7. The gas sensing system of claim 1, wherein each of the first resonator, the second resonator and the third resonator includes a film bulk acoustic resonator (FBAR).

8. The gas sensing system of claim 1, further comprising:
    at least one of (i) a pressure sensor including a fourth resonator on the driving circuit chip, and (ii) an optical sensor including a fifth resonator on the driving circuit chip, the pressure sensor configured to sense pressure to generate a pressure sensing result and the optical sensor configured to sense light to generate an optical sensing result, and wherein
    the driving circuit chip is configured to adjust the gas sensing result based on at least one of the pressure sensing result and the optical sensing result to generate the gas sensing signal.

9. The gas sensing system of claim 1, further comprising:
    a drift compensation sensor on the driving circuit chip, the drift compensation sensor including a sixth resonator without a sensing film coated thereon, the drift compensation sensor configured to generate a drift sensing result, wherein the driving circuit chip is configured to adjust the gas sensing result based on the drift sensing result to generate the gas sensing signal.

10. A gas sensing system comprising:
a driving circuit chip;
a gas sensor on the driving circuit chip, the gas sensor including a first resonator and a first sensing film, the first sensing film being located on the first resonator such that the first sensing film is exposed to an outside of the gas sensing system, the first sensing film configured to sense a first gas to generate a gas sensing result;
a temperature sensor on the driving circuit chip, the temperature sensor including a second resonator and an encapsulation layer, the encapsulation layer being located above the second resonator such that the second resonator is not exposed to the outside of the gas sensing system, the temperature sensor configured to sense temperature to generate a temperature sensing result; and
a humidity sensor on the driving circuit chip, the humidity sensor including a third resonator, the humidity sensor configured to sense humidity to generate a humidity sensing result,
wherein the gas sensing system is configured to adjust the gas sensing result based on at least one of the temperature sensing result and the humidity sensing result to generate a gas sensing signal, and
wherein, in the temperature sensor, the encapsulation layer encapsulates the second resonator such that an air cavity is between the second resonator and the encapsulation layer, and the second resonator includes,
a lower electrode;
a piezoelectric layer on the lower electrode; and
an upper electrode on the piezoelectric layer.

11. A gas sensing device comprising:
a first sensor including a first resonator and a first sensing film, the first sensing film being on the first resonator such that the first sensing film is exposed to an outside of the gas sensing device, the first sensing film being configured to sense a first gas to generate a first sensing result; and
a second sensor including a second resonator and an encapsulation layer, the encapsulation layer being on top of the second resonator and encapsulating the second resonator such that an air cavity is between the second resonator and the encapsulation layer and the second resonator is not exposed to the outside of the gas sensing device, the second sensor configured to generate a second sensing result; and
a driving circuit chip configured to adjust the first sensing result based on the second sensing result to generate at least a first gas sensing signal by,
determining a frequency variation by subtracting a second frequency variation caused by the second sensing result from a first frequency variation caused by the first sensing result, and
generating the first gas sensing signal based on the frequency variation.

12. The gas sensing device of claim 11, wherein the first sensor and the second sensor are implemented as separate sensor chips.

13. The gas sensing device of claim 11, wherein each of the first resonator and the second resonator includes a film bulk acoustic resonator (FBAR).

14. The gas sensing device of claim 11, wherein the second sensor includes a temperature sensor configured to output the second sensing result according to temperature.

15. The gas sensing device of claim 11, wherein the second resonator comprises:
a lower electrode;
a piezoelectric layer on the lower electrode; and
an upper electrode on the piezoelectric layer.

16. The gas sensing device of claim 11, wherein the driving circuit chip comprises:
a calibration circuit configured to generate the frequency variation by subtracting the second frequency variation caused by the second sensing result from the first frequency variation caused by the first sensing result, and to generate the first gas sensing signal based on the frequency variation.

17. The gas sensing device of claim 11, further comprising:
a third sensor on the driving circuit chip, the third sensor including a third resonator and a second sensing film on the third resonator such that the second sensing film is exposed to the outside of the gas sensing device, the second sensing film being configured to sense a second gas to generate a third sensing result, wherein
the driving circuit chip is configured to adjust the third sensing result based on the second sensing result to generate a second gas sensing signal.

18. An electronic device configured to generate a gas sensing signal, the electronic device comprising:
an application processor; and
a gas sensing device electrically connected to the application processor, the gas sensing device including,
a driving circuit chip,
a gas sensor on the driving circuit chip, the gas sensor including a first resonator and a first sensing film on the first resonator such that the first sensing film is exposed to an outside of the gas sensing device, the first sensing film being configured to sense a first gas to generate a gas sensing result,
a temperature sensor on the driving circuit chip, the temperature sensor including a second resonator and an encapsulation layer on the second resonator and encapsulating the second resonator such that an air cavity is between the second resonator and the encapsulation layer and the second resonator is not exposed to the outside of the gas sensing device, the temperature sensor configured to sense temperature to generate a temperature sensing result, and
a humidity sensor on the driving circuit chip, the humidity sensor including a third resonator, the humidity sensor configured to sense humidity to generate a humidity sensing result, wherein
the electronic device is configured to determine a frequency variation between a first frequency of the gas sensing result of the gas sensor and a second frequency of at least one of the temperature sensing result and the humidity sensing result, and to adjust the gas sensing result of the gas sensor based on the frequency variation to generate the gas sensing signal.

19. The electronic device of claim 18, wherein the driving circuit chip is configured to adjust the gas sensing result of the gas sensor based on the at least one of the temperature sensing result and the humidity sensing result to generate the gas sensing signal.

20. The electronic device of claim 18, wherein the application processor is configured to adjust the gas sensing result of the gas sensor based on the temperature sensing result and the humidity sensing result to generate the gas sensing signal.

* * * * *